US009316344B2

(12) United States Patent
Le Gette et al.

(10) Patent No.: US 9,316,344 B2
(45) Date of Patent: Apr. 19, 2016

(54) SYSTEMS, METHODS, AND APPARATUSES FOR SUPPORTING ELECTRONIC DEVICES

(71) Applicant: ZERO CHROMA, LLC, Sykesville, MD (US)

(72) Inventors: Brian E. Le Gette, Severna Park, MD (US); David Reeb, Sykesville, MD (US)

(73) Assignee: ZERO CHROMA, LLC, Sykesville, MD (US)

( * ) Notice: Subject to any disclaimer, the term of this patent is extended or adjusted under 35 U.S.C. 154(b) by 0 days.

(21) Appl. No.: 14/147,697

(22) Filed: Jan. 6, 2014

(65) Prior Publication Data

US 2014/0191106 A1    Jul. 10, 2014

Related U.S. Application Data

(63) Continuation-in-part of application No. 13/735,702, filed on Jan. 7, 2013, and a continuation-in-part of application No. 13/887,036, filed on May 3, 2013.

(51) Int. Cl.
| | |
|---|---|
| F16M 1/00 | (2006.01) |
| F16M 11/04 | (2006.01) |
| F16M 11/10 | (2006.01) |
| F16M 13/00 | (2006.01) |
| F16M 13/04 | (2006.01) |

(52) U.S. Cl.
CPC ............ *F16M 11/041* (2013.01); *F16M 11/10* (2013.01); *F16M 13/00* (2013.01); *F16M 13/04* (2013.01)

(58) Field of Classification Search
CPC ..... F16M 11/10; F16M 11/041; F16M 13/00; F16M 13/04

USPC .............. 248/228.8, 229.17, 230.8, 444, 673, 248/676, 677, 688; 361/679.09, 679.58
See application file for complete search history.

(56) References Cited

U.S. PATENT DOCUMENTS

| 5,161,771 | A | * | 11/1992 | Domeier ....................... 248/676 |
| 6,016,248 | A | | 1/2000 | Anzai et al. |
| 6,266,240 | B1 | | 7/2001 | Urban et al. |
| 6,496,360 | B1 | * | 12/2002 | Cordes et al. ............ 361/679.09 |
| 7,264,216 | B1 | * | 9/2007 | Robling et al. ............... 248/456 |
| 7,387,209 | B2 | * | 6/2008 | Ko et al. ....................... 206/579 |

(Continued)

FOREIGN PATENT DOCUMENTS

JP            5713361 B2 *  5/2015  ................ A45F 5/10

OTHER PUBLICATIONS

Flaminio, Mike, "Speck CandyShell Wrap case/stand for iPad (Video Review)," Feb. 9, 2011, available at http://www.insanely-great.com/news.php?id=11617.

(Continued)

*Primary Examiner* — Gwendolyn W Baxter
(74) *Attorney, Agent, or Firm* — Oblon, McClelland, Maier & Neustadt, L.L.P.

(57) ABSTRACT

An electronic device holder has a movable stand and is configured to be removably connected to one or more different mounting apparatuses that are connected to corresponding objects or directly to a plurality of different objects to support the electronic device holder and thus an electronic device held or supported by the electronic device holder. The movable stand has one or more elastic or stretchable strips that can be stretched or expanded to hold or support the electronic device holder and thus the electronic device.

32 Claims, 26 Drawing Sheets

(56) References Cited

U.S. PATENT DOCUMENTS

| | | |
|---|---|---|
| 8,264,310 B2 | 9/2012 | Lauder et al. |
| 8,382,059 B2 | 2/2013 | Le Gette et al. |
| 8,428,664 B1 * | 4/2013 | Wyers .................. 455/575.1 |
| 8,740,270 B1 * | 6/2014 | Mizell et al. ................ 294/25 |
| 2004/0113036 A1 | 6/2004 | Gilbert |
| 2010/0072334 A1 | 3/2010 | Le Gette et al. |
| 2011/0279959 A1 * | 11/2011 | Lopez .................. 361/679.03 |
| 2012/0111881 A1 | 5/2012 | Gaddis et al. |
| 2012/0199501 A1 | 8/2012 | Le Gette et al. |
| 2012/0275094 A1 | 11/2012 | Zhou et al. |
| 2012/0287565 A1 | 11/2012 | Bennett, Jr. |
| 2013/0043778 A1 | 2/2013 | Bennett, Jr. |
| 2013/0134291 A1 | 5/2013 | Le Gette et al. |

OTHER PUBLICATIONS

Horwitz, Jeremy, "Speck CandyShell Wrap for iPad2," Aug. 8, 2011, available at http://www.ilounge.com/index.php/reviews/entry/speck-candyshell-wrap-for-ipad-2/.

ipad rotating strap handle—Google Search, available at https://www.google.com/?gws_rd=ssl (keywords: ipad case rotating strap handle).

Gripster—The revolutionary iPad grip and stand—Native Union, available at http://www.nativeunion.com/us/gripster-collection.html.

International Search Report and Written Opinion for PCT/US2015/010301 dated May 6, 2015.

* cited by examiner

270

270

SYSTEMS, METHODS, AND APPARATUSES FOR SUPPORTING ELECTRONIC DEVICES

CROSS REFERENCE TO RELATED APPLICATIONS

The present application is a continuation-in-part (CIP) of U.S. patent application Ser. No. 13/735,702 filed Jan. 7, 2013. The present application is also a continuation-in-part (CIP) of U.S. patent application Ser. No. 13/887,036 filed May 3, 2013. The entire content of each of the foregoing applications is hereby incorporated by reference.

SUMMARY

The present invention relates generally to systems, apparatuses, and methods for supporting electronic devices. Embodiments of the present invention involve mounting or supporting apparatuses; electronic device cases, holders or enclosures; components of electronic device cases, holders or enclosures; or portions of any of the foregoing, including those that are integrated in, formed in one piece, or are part of the electronic device encasing itself, as well as those that are removably coupled to the electronic device holder, casing or enclosure (hereinafter "holder"). Non-limiting examples of electronic devices supportable by embodiments of the present invention include cell phones, smartphones, personal digital assistants (PDAs), portable video/music players, medical devices (e.g., physical fitness devices, monitoring or tracking, for instance) electronic tablets, GPS displays, and other portable or handheld electronic devices. Further, the electronic devices may have a frontal LCD, OLED, touch screen, or other display, and the electronic device cases or holders according to one or more embodiments of the present invention can provide unobstructed access to the entire frontal screen or display. Optionally, one or more embodiments of the present invention can provide unobstructed access to a portion or portions of a back side, sides, a top, and/or a bottom of electronic devices.

In one or more embodiments of the present invention, a mounting apparatus is removably attachable or coupleable to an object, such as a portion of a person (e.g., an arm, a head, etc.), a portion of a vehicle (e.g., a portion of a dash, a fold-down blind, a back of a headrest, a bicycle handle bar, etc.), an accessory (e.g., a belt, a brief case, etc.), an appliance or structure (e.g., a refrigerator, a locker, a filing cabinet, etc.), a medical device (e.g., an IV pole or stand, a portable physical fitness device) or an article of clothing (e.g., pants or a jacket). An electronic device or electronic device holder according to an embodiment of the present invention is removably attachable to the mounting apparatus. A movable stand portion of the electronic device or electronic device holder can be the means by which the electronic device or electronic device holder is removably attached to the mounting apparatus. Optionally or alternatively, a portion of the electronic device or electronic device holder, such as a side or end portion thereof may be configured or constructed as the means by which the mounting apparatus can be removably coupled to the electronic device or electronic device holder. Optionally, an orientation of the electronic device or electronic device holder relative to the mounting apparatus may be changed. Optionally, an electronic device can be removably attached to the electronic device holder. Optionally, the electronic device holder may be attached to the mounting apparatus with the electronic device held or encased therein. Thus, the mounting apparatus can be used, worn, carried, hung or otherwise transported or supported, along with a corresponding electronic device, optionally held or encased by the electronic device holder, mounted to the mounting apparatus. Optionally, the mounting apparatus may replace a lid or cover for the electronic device or electronic device holder, or the lid or cover may be used as a mounting apparatus.

In one or more embodiments of the present invention an electronic device holder has a movable stand portion, which may be moveable in more than one direction, such as extendable and optionally rotatable. Generally speaking, a portion or portions of the electronic device holder may be coupled to a corresponding mounting apparatus or directly to an object to support (e.g., hold, hang, etc.) the electronic device holder, and a portion or portions of the electronic device holder are movable relative to the mounting apparatus. The portion or portions of the electronic device holder coupled to the mounting apparatus or the object may remain stationary.

Optionally, the movable stand may have an elastic or stretchable strap wrapped therearound, entirely, substantially entirely, or partly. For example, the elastic or stretchable strap may wrap around the movable stand in a lengthwise direction of the movable stand, around the ends thereof, but may not extend over or cover the sides of movable stand. As another example, the elastic or stretchable strap may not extend over or otherwise cover the tip or end of the stand where the stand would contact a support surface and also not extend over or cover the sides of movable stand. In one or more embodiments, the elastic or stretchable strap may cover an entirety or substantially an entirety of the surface area of the movable stand, excluding the sides of the movable stand. Optionally, the elastic or stretchable strap may cover the surface area of the movable stand by an area of any of 20%-99% individually or as a range, exclusive of the sides but not the top and/or bottom ends. In its unexpanded form, the elastic or stretchable strap may fit tightly around the movable stand such that it takes the shape of or substantially takes the shape of the movable stand, for instance, without any space or almost without any space therebetween. In an expanded form the elastic or stretchable strap can extend from the movable stand to form one or more openings, on a first side only, on a second side only or on both the first side and the second side of the movable stand, for example, so a user may insert one or more fingers, a hand, an arm, a head, a leg or a torso, for instance, or so the elastic or stretchable strap can be affixed to an inanimate object, such as hook or other support mechanism. The elastic or stretchable strap can return to its original shape around the movable stand upon release of expanding or stretching forces that stretch or expand the strap from its original position. The elastic or stretchable strap may be permanently or removably affixed or coupled to the movable stand by one, two, three, four or more coupling, engagement, or connection points or portions.

According to an embodiment of the present invention, the electronic device holder can have a cover to enclose a front, viewing or control side of an electronic device enclosed or held by the electronic device holder. Optionally, the cover can be detachable from the electronic device without the need of an electronic device holder. Optionally, the cover may be detachable from the electronic device holder, for example, via a connection mechanism or an adapter that itself optionally may be removable from the electronic device holder. Also, optionally, the cover may be removable from the adapter, the electronic device or the electronic device holder and replaced with another component compatible with the adaptor or the connection mechanism of the electronic device or electronic device holder, respectively, such as a cover with an integrated keyboard (e.g., musical or alphanumeric) or a connection portion for the keyboard, an electronic writing pad, etc. or a mounting apparatus, such as described herein. Thus, the component, such as a mounting apparatus or an object as described herein, may be directly connected to the electronic device, the electronic device holder and/or connected to the adapter connected to the electronic device or electronic device holder. Additionally, according to an embodiment of the present invention, the cover may act as a support surface for the movable stand. Optionally, the electronic device, the electronic device holder, and/or the cover itself may be configured as a mounting apparatus for mounting to an object, such as those discussed above.

According to one or more embodiments of the present invention, a system to support an electronic device, comprises an electronic device holder to hold the electronic device; and a movable stand arranged on a back side of said electronic device holder, the movable stand being movable to at least one holdable position to support the electronic device holder at a corresponding angle, where the movable stand includes an elastic strip coupled thereto, for example, fixedly.

Optionally, the elastic strip is fixedly coupled to the movable stand at only position. The only one position may not be at a hinge or pivot portion for movement of the movable stand from a retracted position to the at least one holdable position, or it may be at an end of the movable stand opposite an end thereof for movement of the movable stand from a retracted position to the at least one holdable position. Alternatively, the elastic strip is fixedly coupled to the movable stand at a plurality of spaced apart positions. In one or more embodiments, the elastic strip is fixed to only one side of the movable stand. Optionally, the one side of the movable stand is a side of the movable stand facing away from an internal volume of the electronic device holder to hold the electronic device when the movable stand is in a fully retracted position. Alternatively, the one side of the movable stand is a side of the movable stand facing toward an internal volume of the electronic device holder to hold the electronic device when the movable stand is in a fully retracted position.

Optionally, the electronic device holder includes a connection mechanism formed in one piece therewith that is configured to be removably coupled to one or more different mounting apparatuses that are connected to corresponding objects, or directly to a plurality of different objects. The system may further comprise a mounting apparatus, where the mounting apparatus is removably coupled to the electronic device holder.

Embodiments of the present invention also include an electronic device holder configured to support an electronic device, comprising: a body portion including a connection mechanism formed in one piece therewith; and a movable stand portion connected to the body portion, wherein the connection mechanism is configured to be removably coupled to one or more different mounting apparatuses that are connected to corresponding objects or directly to a plurality of different objects to support the electronic device such that a user can access and operate an operational portion of the electronic device.

Optionally, the movable stand portion has a leg that is outwardly rotatable from the body portion and inwardly rotatable toward the body portion, the leg being settable in a plurality of different positions, including a fully extended position, a fully retracted position, and at least one position therebetween. The electronic device holder may also optionally comprise an elastic strap permanently coupled to a leg of the movable stand portion. The elastic strap, which may have a portion or portions that do not stretch, may be flush against the leg when the elastic strap is in an unstretched state, with no or nearly no space existing between the elastic strap and the leg, and the elastic strap may be formed around the leg of the movable stand portion in a length-wise direction such that no portion of the elastic strap covers length-wise sides of the leg when the elastic strap is in the unstretched state. Further, the elastic strap may be permanently or semi-permanently (i.e., removably) coupled to the leg at only one connection area. Alternatively, the elastic strap may be permanently or semi-permanently coupled to the leg at a plurality of different, spaced-apart connection areas. In one or more embodiments, the elastic strap is flush or does not extend from the body portion when the leg is in its fully retracted position. Optionally, the electronic device holder can comprise a connection portion; and an elastic strap permanently or semi-permanently coupled to a leg of the movable stand portion via a permanent or semi-permanent connection to the connection portion, wherein the connection portion is comprised of injection molded plastic and the elastic strap is comprised of a fabric material. Optionally, the connection portion is at a tip of an end of the leg opposite an end of the leg around a hinge or pivot of the leg relative to the body portion. Thus, in embodiments of the present invention, the elastic strap may be removed. Optionally, the removed elastic strap may be replaced with another elastic strap coupled to the leg. Such removal of the elastic strap can be, for example, by way of disconnecting the ends of the elastic strap from the connection point or area, disconnecting one end of the elastic strap from the connection point or area and disconnecting the connection point or area from the leg, or disconnecting the leg from the body portion and disconnecting the connection point or area from the leg.

According to an embodiment of the present invention, a system to support an electronic device comprises an electronic device holder to hold the electronic device; a movable stand arranged on a back side of the electronic device holder; and an elastic strap arranged around the movable stand.

An embodiment of the present invention also includes an electronic device holder to hold an electronic device that comprises: a body including a coupling mechanism on a front face thereof to receive and hold the electronic device; and one of an adaptor and a mounting apparatus removably coupled to the body.

Also, an embodiment of the present invention includes a system to support an electronic device that comprises an electronic device holder to hold the electronic device; and a movable stand arranged on a back side of the electronic device holder, the movable stand being configured to be releasably coupled to a mount and movable in at least three different directions, two of the three directions being outward from the electronic device holder and inward toward the electronic device holder.

In addition, in another embodiment of the present invention, a system to support an electronic device comprises an electronic device holder to hold the electronic device; and a movable stand arranged on a back side of the electronic device holder, the movable stand being configured to be releasably coupled to a mount and movable in at least three different directions, two of the three directions being outward from the electronic device holder and inward toward the electronic device holder, wherein the movable stand is configured to allow movement of the electronic device holder relative to the mount when the movable stand is releasably coupled to the mount.

In another embodiment, an electronic device holder to hold an electronic device comprises a body including a back side and a front side having a coupling mechanism to receive and hold a first portion of the electronic device; and an adaptor removably coupled to a side portion of the body, the adaptor being configured to receive and hold a second portion of the electronic device.

According to one or more embodiments of the present invention, a support mechanism for a portable device comprises: a body including a coupling portion configured to couple a portable device to the body via a front face of the body; and a support rotatably coupled to the body such that the orientation of the support relative to the body is changeable to support the body and the portable device in a plurality of different orientations relative to a support surface, the support being movable between a retracted position and a fully extended position relative to the body, the support being fixable at the fully extended position and a plurality of positions between the retracted position and the fully extended position, the support being engageable with the support surface in any of its extended positions in any of its orientations, wherein the support includes a base, a coupler, and a stand, the coupler being coupled to the base and the stand, and the stand being coupled to the base and the coupler.

Optionally, the coupler is slidably and friction-fit coupled to the stand and rotatably coupled to the base, and the stand is rotatably coupled to the base. The plurality of positions between the retracted position and the fully extended position include any number of undefined fixable positions. Optionally, the coupler is slidably and friction-fit coupled to the stand so as to be movable between the fully extended position and the retracted position, the friction-fit coupling being provided by a friction sleeve of the stand through which a portion of the coupler traverses. In one or more embodiments, the coupler is a U-shaped pin, wire, or rod. Additionally, optionally, the fully extended position of the stand is greater than ninety degrees, and the support is rotatable relative to the body by more than 270 degrees. Optionally, the holder consists of three distinct plastic or rubber components and a metal component, the plastic or rubber components being the body, the base, and the stand, and the metal component being the coupler. In one or more embodiments, the stand is flush or substantially flush with an uppermost portion of the base in side, end, or cross-sectional view.

Additionally, in one or more embodiments, a method comprises: providing a holder for a portable electronic device, the holder including: a body having a coupling portion configured to couple the portable electronic device to the body via a front side of the body; and a support rotatably coupled to the body such that an orientation of the support relative to the body is changeable to support the body and the portable electronic device in a plurality of different orientations, the support including a base, a coupling mechanism in the form of a generally U-shaped metallic pin, and a stand, the coupling mechanism being pivotably coupled to the base about a first axis, the stand being pivotably coupled to the base about a second axis different from the first axis, the coupling mechanism being slidably coupled to the stand such that a portion of the coupling mechanism is always frictionally slidable from a first end to a second end of a hollow sleeve portion formed in the stand such that the stand is fixable at a fully extended position and a plurality of positions between a fully retracted position and the fully extended position, the stand being engageable with a support surface in any of its extended positions in any of its orientations, the hollow sleeve portion being without surface features, and the plurality of positions between the fully retracted position and the fully extended position being a plurality (e.g., more than one, more than two, more than three, more than five, more than ten, more than twenty, etc.) number of undefined fixable positions.

Optionally, the method further comprises coupling the portable electronic device to the body via the front side of the body. In one or more embodiments, optionally, the hollow sleeve portion includes two separate sleeves. Alternatively, the hollow sleeve portion consists of a single sleeve. Further, optionally, of plastic components, the holder consists of three distinct plastic components, the three plastic components being the body, the base, and the stand. In one or more embodiments, a middle portion of the coupling mechanism in the form of the generally U-shaped metallic pin is slidably and pivotably coupled to the stand such that the middle portion of the coupling mechanism is always frictionally slidable from the first end to the second end of the hollow sleeve portion formed in the stand such that the stand is fixable at the fully extended position and the plurality of positions between the fully retracted position and the fully extended position, and ends of the coupling mechanism in the form of the generally U-shaped metallic pin are pivotably coupled to the base about the first axis. Alternatively, a middle portion of the coupling mechanism in the form of the generally U-shaped metallic pin is pivotably coupled to the base about the first axis, and ends of the coupling mechanism in the form of the generally U-shaped metallic pin are slidably coupled to the stand such that the ends of the coupling mechanism is frictionally slidable from the first end to the second end of the hollow sleeve portion formed in the stand such that the stand is fixable at the fully extended position and the plurality of positions between the fully retracted position and the fully extended position.

One or more embodiments of the present invention include a method of making a holder for an electronic device comprising only three plastic or rubber components and no more than two metallic components, the method of making comprising: providing a body portion that includes a coupling portion configured to couple a portable device to the body portion; providing a support portion adapted to be rotatably coupled to the body; providing a stand portion adapted to be pivotably coupled to the support; providing a coupling portion adapted to be pivotably coupled to the support portion and slidably coupled to the stand portion; coupling the support portion to the body portion; coupling the coupling portion to the stand portion; coupling the coupling portion to the support portion; and coupling the stand portion to the support portion.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF THE INVENTION

The description set forth below in connection with the appended drawings is intended as a description of various embodiments of the invention and is not necessarily intended to represent the only embodiments in which the invention may be practiced. In certain instances, the description includes specific details for the purpose of providing an understanding of the invention. However, it will be apparent to those skilled in the art that the invention may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Further, it is intended that the present invention and embodiments thereof cover the modifications and variations. For example, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit the present invention to any particular orientation or configuration. Furthermore, terms such as "first," "second," "third," etc., merely identify one of a number of portions, components and/or points of reference as disclosed herein, and likewise do not necessarily limit the present invention to any particular configuration or orientation.

As noted above, embodiments of the present invention are directed to systems, apparatuses, and methods for supporting electronic devices. One or more embodiments of the present invention involve mounting apparatuses, electronic device holders, components of electronic device holders, and/or portions of any of the foregoing.

Figure 1:
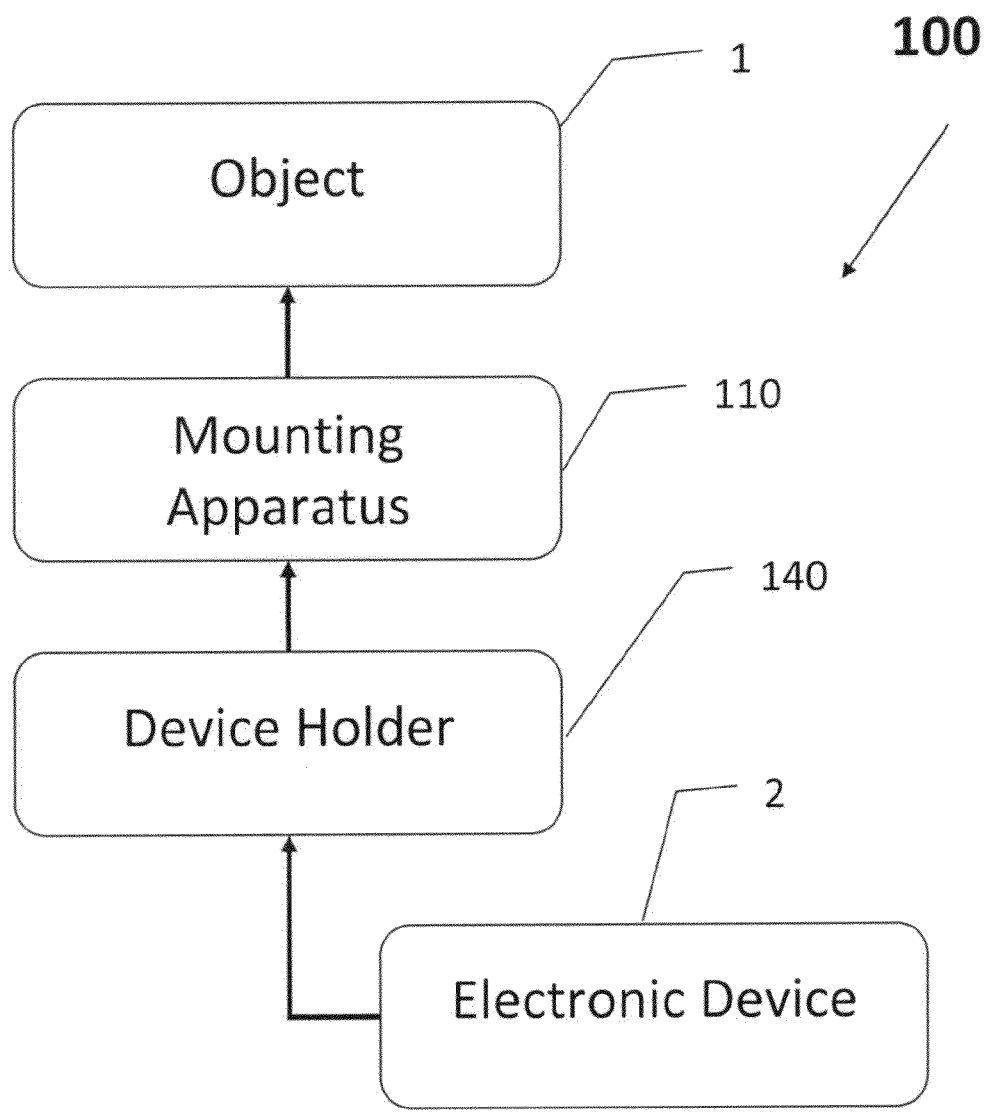
FIG. 1 is a block diagram of system for supporting an electronic device according to an embodiment of the present invention.

FIG. 1 is a block diagram of support system 100 for an electronic device according to one or more embodiments of the present invention.

System 100 can include a mounting apparatus 110 and an electronic device holder 140. The mounting apparatus 110 is removably attachable or coupleable to an object 1, such as a portion of a person (e.g., an arm, a head, etc.), a portion of a vehicle (e.g., a portion of a dash, a fold-down blind, a back of a headrest, a bicycle handle bar, etc.), an accessory (e.g., a belt, a brief case, etc.), an appliance or structure (e.g., a refrigerator, a locker, a filing cabinet, etc.), a medical device (e.g., an IV pole or stand, a physical fitness device, etc.), or an article of clothing (e.g., pants, a jacket, etc.). Optionally, the mounting apparatus 110 can be an arm band or strap and corresponding attachment mechanism, such as that illustrated and described in U.S. application Ser. No. 13/735,702 filed Jan. 7, 2013 or a coupling member such as described and illustrated in U.S. patent application Ser. No. 13/887,036 filed May 3, 2013. The electronic device holder 140 is removably attachable or mountable to the mounting apparatus 110 via a mounting portion of the mounting apparatus 110. For example, the mounting apparatus 110 may be removably coupled to the electronic device holder 140 by a connection mechanism of the electronic device holder, such as a movable stand portion thereof or a side, back or end connection mechanism portion of the body of the electronic device holder. Optionally, the mounting apparatus may be connected to the electronic device holder via an adapter (not expressly shown), or the mounting apparatus may be considered an adapter for connection to the object. Optionally, the connection mechanism of the electronic device holder may be considered the mounting apparatus. Thus, optionally or alternatively, the electronic device holder 140 may be removably attachable directly to the object 1, without providing the mounting apparatus 110 for the system 100 or without the mounting apparatus 110 being attached to the object 1. An electronic device 2 can be removably attached or coupled to the electronic device holder 140 via a coupling mechanism included on an open or front face or side of the electronic device holder 140.

FIGS. 2-7 illustrate a system 200 for supporting an electronic device according to an embodiment of the present invention. Optionally, system 200 may be considered a holder 200, as defined herein, for an electronic device. Holder 200 is illustrated in FIGS. 2-7 as being sized, shaped and configured for a particular electronic device, but electronic device holder 200 can be sized, shaped and/or configured to hold any suitable electronic devices without departing from the essence, spirit, or scope of the present invention. Optionally, holder 200 can be substantially the same as the holders described and illustrated in U.S. patent application Ser. No. 13/887,036 filed May 3, 2013, modified, if necessary, to accommodate one or more parameters, such as thickness, of an elastic or stretchable strap formed around or coupled to a stand or leg of holder 200, which will be discussed in more detail below.

Electronic device holder 200 can include a body portion 210 and a base or support portion 250. Base or support portion 250 can be located such that it is not centrally arranged in a length-wise direction of the body portion 210. For example, base portion 250 may be arranged at a bottom or a top third of the body portion 210 in a length-wise direction of the body portion 210.

An electronic device 2 can be removably coupled to the electronic device holder 200 by way of a front face 202 of the electronic device holder 200. More specifically, the electronic device 2 can be inserted into the electronic device holder 200, via the front face 202, such that the edges or sides of the electronic device 2 are completely or partially surrounded or covered by the body portion 210 (e.g., a frame portion) of the electronic device holder 200 and held by friction fit and/or snap fit, for example. Portions of the body 210 can cover or surround a front face portion of the electronic device (not expressly shown) and, optionally, such portions do not cover an access or operation portion of the electronic device, such as a touch screen, display, or keypad area of the electronic device 2, so a user may access or operate these portions. Optionally, body portion 210 can have access portions 212 to access or provide access to portions, buttons, interfaces, vents, etc. on the edges or sides of the electronic device. The access portions 212 can include, but are not limited to, parts with no material or holes, clear portions, preformed "buttons," or the like.

Body portion 210 also includes a mounting portion 214 constructed to rotatably connect to and house a base portion 260 of support portion 250, for example, as shown and illustrated in FIGS. 2-7. Mounting portion 214 can have a thickness to allow a stand or leg 270 (to be discussed in more detail below) to be fully recessed within an opening formed in base portion 260 such that the stand 270 is flush or substantially flush with the top of the mounting portion 214 and the base portion 260. Optionally, the top of the mounting portion 214 (e.g., by one millimeter in the thickness direction of the mounting portion 214) may exceed in height slightly the base portion 260 and the stand 270 when the stand is fully retracted in the opening discussed above, with the base portion 260 and the stand 270 being flush or substantially flush with each other and with the top of the mounting portion 214. Though not so limited, the rotatable connection and housing of the base portion 260 by the mounting portion 214 can be based on or as set forth in U.S. patent application Ser. No. 12/758,377 filed Apr. 12, 2010 (now U.S. Pat. No. 8,382,059); U.S. patent application Ser. No. 13/345,345 filed Jan. 6, 2012; U.S. patent application Ser. No. 13/745,693 filed Jan. 18, 2013; U.S. patent application Ser. No. 13/735,702 filed Jan. 7, 2013; U.S. patent application Ser. No. 13/735,702 filed Jan. 7, 2013; or U.S. patent application Ser. No. 13/887,036 filed May 3, 2013. The entire content of each of the foregoing applications is hereby incorporated by reference herein.

As alluded to above, rotation positions of the support portion 250 around its central axis (i.e., center portion of the circle defined by the support portion 250) relative to mounting portion 214 can be undefined, and thus the support portion 250 can be rotated, clockwise and/or counterclockwise, to any orientation, including 0 degrees from any starting point, 90 degrees from the starting point, 180 degrees from the starting point, 270 degrees from the starting point, 360 degrees or greater from the starting point, or anywhere in between. Alternatively, support portion 250 can be rotated to preset or predefined positions, such as some or all of those expressly set forth above. Optionally, portions of undefined positions and defined support portion 250 orientations can be implemented, such as orientations non-orthogonal or non-parallel to landscape or portrait orientations.

As noted above, support portion 250 can include base portion 260, stand or leg portion 270, a first coupler, coupling mechanism, or fastener 280, and a second coupler, coupling mechanism, or fastener 290 that rotatably couples the stand 270 to base portion 260 such that the stand 270 can be rotatably retracted and extended inwardly and outwardly, respectively, about a rotational axis of the second coupler 290. First coupler 280 can be rotatably coupled to base portion 260 such that first coupler 280 can be rotatably retracted and extended inwardly and outwardly, respectively, about a rotational axis at which the first coupler 280 is rotatably coupled to base portion 260. Further, first coupler 280 can be frictionally and slidably coupled to stand 270 such that the stand 270 can be fixed in a plurality of different positions, including fully extended, fully retracted, or anywhere in between. Base portion 260 can also include notches (not expressly shown). Thus, an electronic device 2 may be mounted or supported, by way of the electronic holder 200, to an object or mounting apparatus as described herein.

First coupler 280 can be a U-shaped or generally U-shaped pin or wire (e.g., metallic) having ends, for example bent ends, that can be coupled to respective inner sides of base portion 260 such that the pin 280 can rotate about an axis running between the two points at which the ends are coupled to respective retaining mechanisms of inner sides of base portion 260. For example, the ends may be rotatably coupled to the inner sides of base portion 260 via respective holes. Optionally, the ends may be removably coupled to the respective holes in the inner sides of base portion 260, for example, by forcing the ends inwardly toward each other such that they become free of their respective retaining mechanisms (e.g., the respective holes).

A middle portion 282 of the pin 280 can extend through an elongate sleeve 271 formed in stand 270, from one side of the stand 270 to another side of the stand 270. The sleeve 271 is elongate in both width- and length-wise directions of the stand 270. The elongate sleeve 271 can be a tight sleeve and can act on the middle portion 282 of pin 280 in a sliding friction fit manner, without the use of notches, grooves, or some other recessed or protruding members, for example, such that the pin 280 and thus the stand 270 can be held or fixed in any of a plurality of positions, for example, from a fully extended position of the stand 270 to anywhere in between the fully extended position and a fully retracted position of the stand 270. Thus, middle portion 282 of pin 280 can move from one end of the sleeve 271 to the other end of sleeve 271 (in a length-wise direction of the stand 270) such that the stand 270 can be frictionally held in a fully retracted position, a fully extended position, or any number of positions between the fully extended position and the fully retracted position. Put another way, other than the fully extended position and the fully retracted position, one or more embodiments of the present invention do not include predetermined or predefined set positions to which the stand 270 can be extended or retracted, because the sleeve 271 may not include notches, grooves, or some other recessed or protruding members. When the stand 270 is fully retracted (i.e., fully seated in its opening in base portion 260), the pin 280 is not exposed to view from a back side of the electronic device holder 200 and is hidden beneath ledges of stand 270.

Optionally, the interior of the sleeve 271 may taper in one or both directions (in a length-wise or width-wise direction of the stand 270), at one end, at both ends, in a middle portion, one the sides, or anywhere along its length or width, such that the friction force applied to the middle portion 282 of pin 280 varies as pin 280 slides within sleeve 271. One advantage of implementing a tight sleeve without notches, grooves, etc., is because any position or positions between the fully extended position and the fully retracted position can be realized. Another advantage of implementing a tight sleeve without notches, grooves, etc., is because such sleeve can be relatively easier to manufacture without defects in the sleeve that might preclude any number of retracted/extended positions. Alternatively, one or a plurality of notches, grooves, bumps, some other recessed or protruding members, or some other semi-permanent engagement mechanism or combination thereof for engagement of the pin 280 in the sleeve 271 may be implemented to hold the stand 270 in a particular, predefined or predetermined position or positions.

The middle portion 282 of pin 280 can run in a straight line from one side of the stand 270 to the other side of the stand 270 parallel to a width-wise direction of the stand 270, hence the aforementioned U-shape nomenclature. However, the middle portion 282 is not limited to such a configuration and may take other forms, such as a zig-zag, sinusoidal, "on-off" pattern, or arced in the width-wise and/or thickness direction of the stand 270 or sleeve 271 to create different frictional forces along sleeve 271. Further, the middle portion 280 can have varying thickness across its length.

Second coupler 290, as noted above, can rotatably couple the stand 270 to base portion 260 such that the stand 270 can be rotatably retracted and extended inwardly and outwardly, respectively, from and between the fully retracted and extended positions, about a rotational axis of the second coupler 290. In one or more embodiments, second coupler 290 is a straight pin or wire that extends through a pin hole from one side of the stand 270 to the other side (in a width-wise direction of the stand 270), with ends of the pin 290 being rotatably coupled to respective retaining mechanisms (e.g., respective pin holes) in the inner sides of base portion 260. Alternatively, the second coupler 290 can include individual pins or projections from the stand 270 that are rotatably coupled to respective retaining mechanisms (e.g., respective pin or projection holes) in the inner sides of base portion 260. Optionally, the projections to be rotatably coupled to respective retaining mechanisms (e.g., projection holes) in the inner sides of base portion 260 may be formed in one piece with the stand 270, of the same material as the stand 270 and in a same manufacturing process as the stand 270 (e.g., injection molding). Further, a plurality of pressure points, such as three pressure points, formed on a back side of base portion 260 can keep or bias the support portion 250 centered within the base portion, though a certain amount of play is acceptable.

Figure 2:
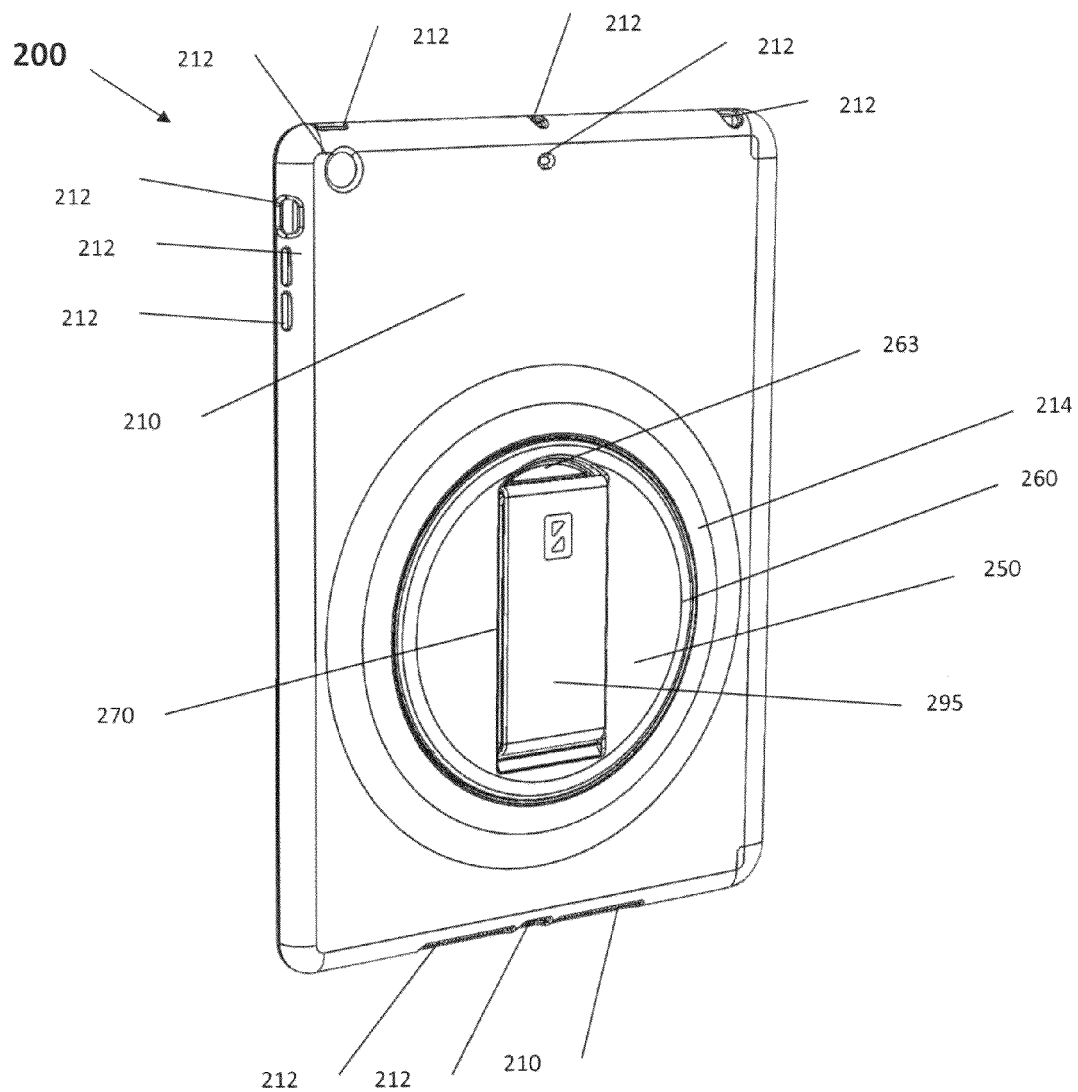
FIG. 2 is a left rear perspective view of a system (or apparatus) for supporting an electronic device according to an embodiment of the present invention.
Figure 3:
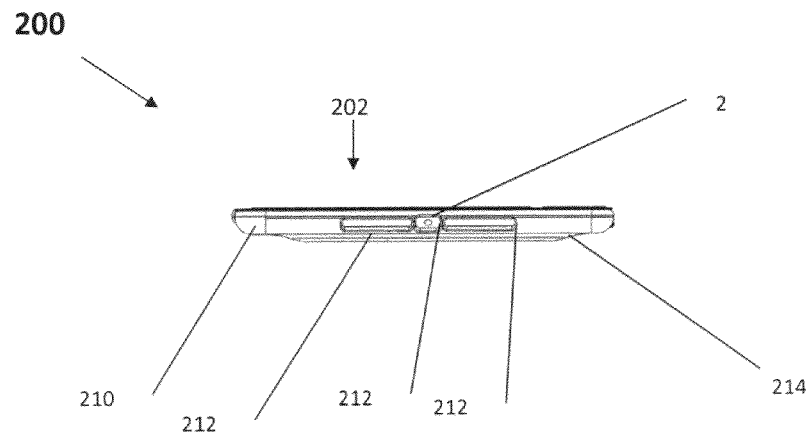
FIG. 3 is a bottom end view of the system of FIG. 2.

Base portion 260 can include a recess portion 263, which may extend from one side of the stand 270 to the other side of the stand 270, such as illustrated in FIG. 2.

Optionally, recess portion 263 can facilitate seating of the stand 270 in the corresponding opening and/or rotatable extension of the stand 270 from its fully retracted position to an extended position, for example, by a user finger, thumb, or some other object that fits within the recess portion 263 to pry or lift up the stand 270 from its fully seated or retracted position in the corresponding opening.

Optionally, an elastic or stretchable strap 295 may be formed around a portion of the stand 270. The strap may be made of an elastic material, such as a woven fabric, synthetic material, or a polymer, for instance, and may have one or more portions along its length that do not stretch or do not stretch as much as the elastic material. As an example, strap 295 is illustrated in FIGS. 2-7 as wrapping around the stand 270 in a lengthwise direction of the stand 270, around the ends thereof, but does not extend over or cover the sides of the stand 270. Thus, strap 295, in this embodiment, covers the entirety of the surface area of the stand 270 excluding the sides of the stand 270. In one or more embodiments, the elastic or stretchable strap may cover substantially an entirety of the surface area or a lesser amount of the movable stand, excluding the sides. Optionally, the elastic or stretchable strap may cover the surface area of the movable stand by any of 20%-99% individually or as a range, excluding the sides but not the top and/or bottom ends of the stand 270. Alternatively, the strap 295 may cover some or all of only one side of the stand 270. For example, the strap 295 may cover some or all of a back side of the stand 270 or some or all of a front side of the stand 270.

Strap 295 can be coupled, fixedly or removably, to stand 270 at one or more connection points. For example, FIGS. 2-7 illustrate strap 295 being connected to stand 270 at connection point 296, which may be of a different material than the strap 295, such as a plastic piece connected at ends thereof to the strap 295 and coupled to (e.g., with adhesive or glue) the stand 270 or alternatively formed integrally with or in one piece with the stand 270, for instance by injection molding or welding. The connection of strap 295 to stand 270 illustrated in FIGS. 2-7 can be such that the strap provides the stretch value of both sides thereof, since only one connection point exists. Further, optionally, the connection point is not located on the side of the stand 270 where the second coupler 290 is located. Optionally, the connection point for the strap 295 can be located at a tip or end of the stand 270 where the stand will come into contact with a support surface (i.e., opposite the end of the stand where second coupler 290 is located). That is, optionally, any portion of the stand 270, such as its tip, that is intended to come into contact with a support surface, for example, when the stand 270 is in any of its extended positions, may be the connection point 296 and, as such, may be formed of a material, such as hardened plastic or rubber, that would be more durable for abutting against a support surface than would a material of the strap 295. The strap 295 may be flush or substantially flush with a top surface of the base portion 260, or, optionally, strap 295 may project above the base portion 260. The figures herein illustrate a connection point 296 facing inward toward where the electronic device 2 is arranged or is to be arranged in body portion 210 when the stand 270 is in a fully retracted state. However, a connection point may be arranged on the other side of stand 270, alternatively on in addition to the connection point 296 facing inward. Connection of the strap 295 at an end or tip of the stand 270 as discussed above can prevent the strap 295 from sliding over or off the tip or end. Additionally, the strap 295 may be permanently or semi-permanently (i.e., removably) coupled to stand 270. For example, strap 295 may be permanently fixed to the connection point 296, and the connection point 296 can be semi-permanently connected to stand 270, for instance, by snap fit, a sliding connection in a direction perpendicular to a length-wise direction of the stand 270, a sliding connection in a direction perpendicular to a length-wise direction of the strap 295, etc. As another example, both ends of the strap 295 can be disconnected from the connection point 296 or the stand 270 (in a case that the stand itself is considered the "connection point"). In another example, the stand 270 may be disconnected from body 210 and the connection point 296, with the strap 295 coupled thereto, can be disconnected from stand 270. Thus, in embodiments of the present invention, the strap 295 may be removed. Optionally, the removed strap 295 may be replaced with another elastic strap coupled to the stand 270 directly or via connection point 296.

Figure 4:
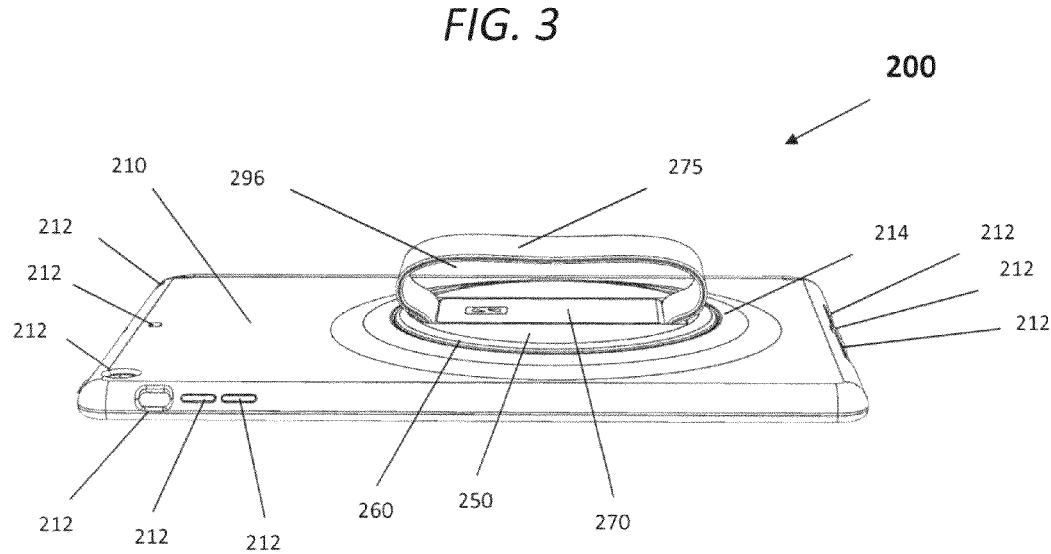
FIG. 4 is a left side perspective view of the system of FIG. 2 with an elastic strap in an extended position.
Figure 5:
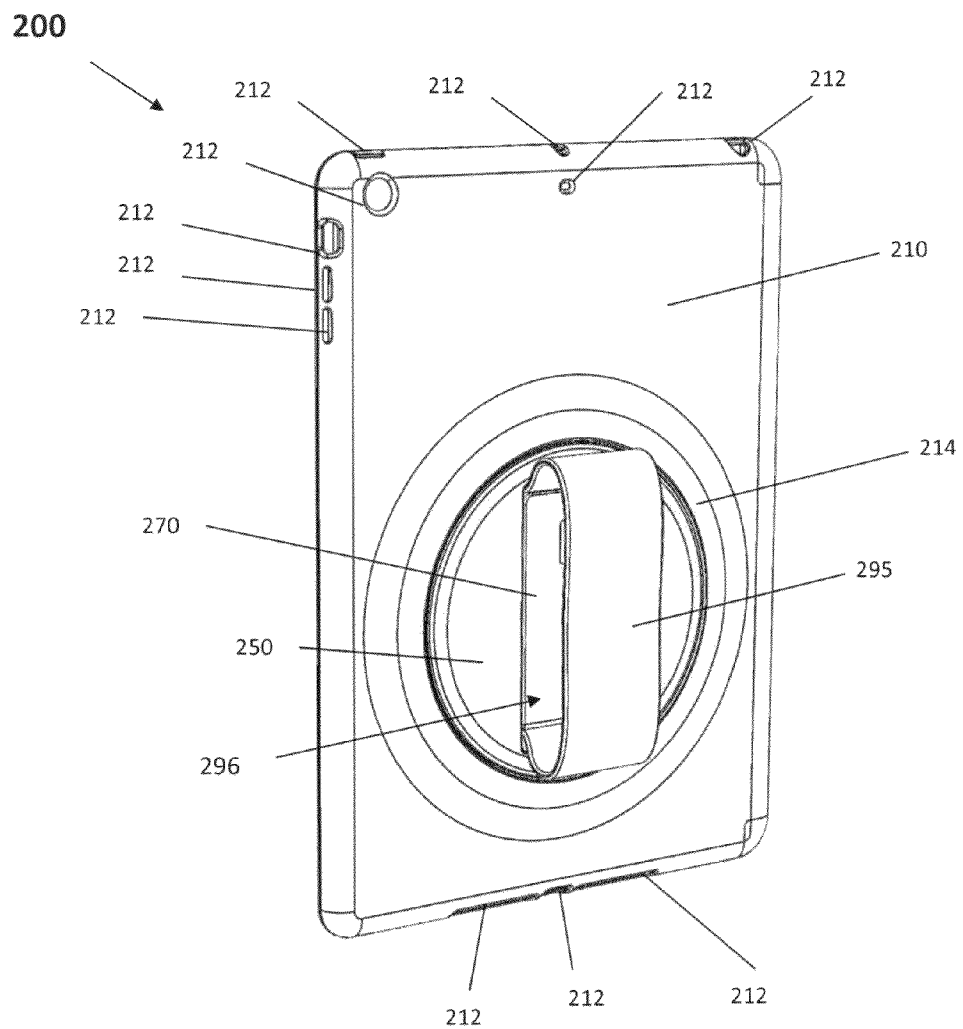
FIG. 5 is a left rear perspective view of the system of FIG. 2 with an elastic strap in a stretched or expanded state.
Figure 6:
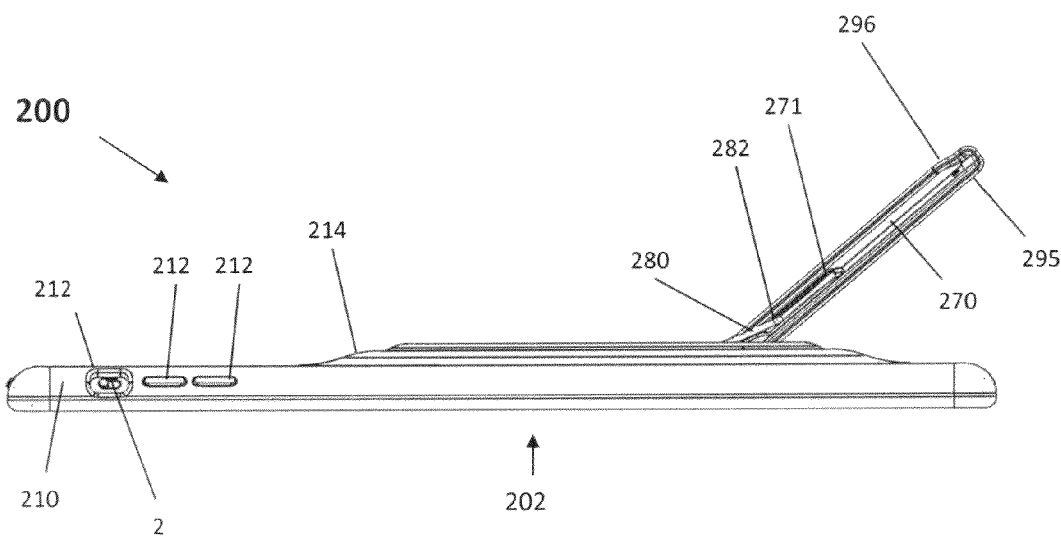
FIG. 6 is a left side view of the system of FIG. 2 with a movable stand in an extended position.
Figure 7:
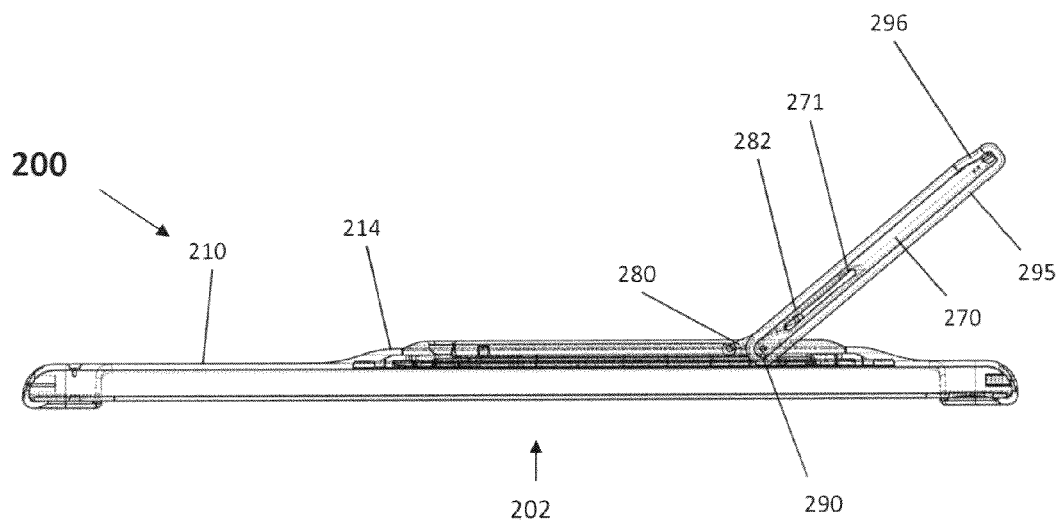
FIG. 7 is a left side cross-sectional view of the system of FIG. 2 with a movable stand in an extended position.

In its unexpanded form, the elastic or stretchable strap 295 may fit tightly around the movable stand 270 such that it takes the shape of the movable stand 270, for instance as illustrated in FIGS. 2, 3, 6, and 7. In an expanded form, such as illustrated in FIGS. 4 and 5, the strap 295 can extend from the movable stand 270 to form an opening 296, for example, so a user may insert one or more fingers, a hand, an arm, a leg or a torso, for instance, or so the elastic or stretchable strap can be affixed to an inanimate object, such as hook or other support mechanism. The elastic or stretchable strap 295 can return to its original shape upon release of expanding or stretching forces that stretch or expand the strap from its original position. Though not expressly illustrated in the figures, strap 295 may be expandable or stretchable in any of the positions of the stand 270, including when the stand 270 is fully retracted, fully extended, or any of the stand positions in between. Further, as noted above, more than one connection point may be employed in various embodiments, such as two, three, four or more. Additionally, in embodiments, strap 295 may be two comprised of two straps, distinct or as portions of one strap, connected to a same side or different sides of the stand 270. For example, the strap 295 may have two or more separate or separated portions that run in a same plane (i.e., beside each other) in a length-wise direction of the stand 270. Optionally, only one side of the stand 270, i.e., the front side or the back side, may have a strap 295. Also, optionally, strap 270, based on its connection points, may form predetermined non-stretchable (or less stretchable) and/or stretchable or expandable portions for specific objects to be inserted through respective openings formed when stretched or expanded. For example, different portions of the strap 295 may be expanded to accommodate different fingers or finger combinations of a person wishing to hold the holder 200 via the strap 295. Further, when stand 270 is in one of its extended positions, the strap 295 can be pulled or stretched from a side or sides of the stand 270 on or over which the strap 295 is arranged. For example, when strap 295 is on both sides of the stand 270, the strap 295 can be pulled or stretched from both sides, for instance, so fingers or a hand can be slid under the strap 295 on the inside and/or outside of the stand 295, thus allowing a plurality of holding or support positions.

Body portion 210 and support portion 250 can be made of the same material, for example, thermoplastic or rubber, or alternatively some portions of may be made of different materials. Further, body portion 210 and support portion 250 (and respective components thereof) can be formed by molding, for example, injection molding. Thus, electronic device holders 200 according to embodiments of the present invention may be comprised of only two or three separate plastic or rubber parts, for example, the body portion 210, the base portion 260, and the stand 270 in the case of three plastic or rubber parts.

FIGS. 8-15 are images of a system 800 for supporting an electronic device 2 according to an embodiment of the present invention. Optionally, system 800 may be considered a holder 800, as defined herein, for an electronic device. Holder 800 is illustrated in FIGS. 8-15 as being sized, shaped and configured for a particular electronic device 2, but electronic device holder 800 can be sized, shaped and/or configured to hold any suitable electronic devices without departing from the essence, spirit, or scope of the present invention. Further, holder 800 is substantially as described and illustrated with respect to FIGS. 2-7, with the exception that holder 800 includes a coupling portion 860 that is constructed to have removably coupled thereto an object, a mounting apparatus, or an adapter as described herein. Thus, like items will not be described again and are labeled with the same reference numbers.

Figure 8:
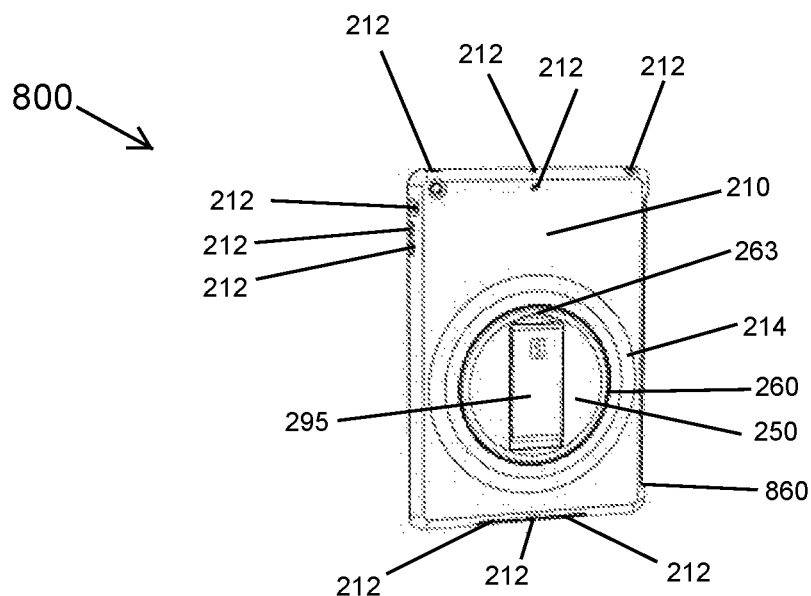
FIG. 8 is a rear perspective view of a system (or apparatus) for supporting an electronic device according to another embodiment of the present invention.
Figure 9:
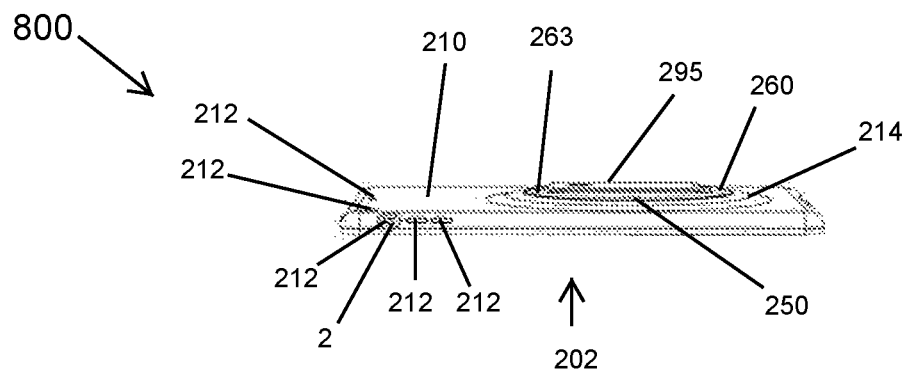
FIG. 9 is a left side perspective view of the system of FIG. 8.
Figure 10:
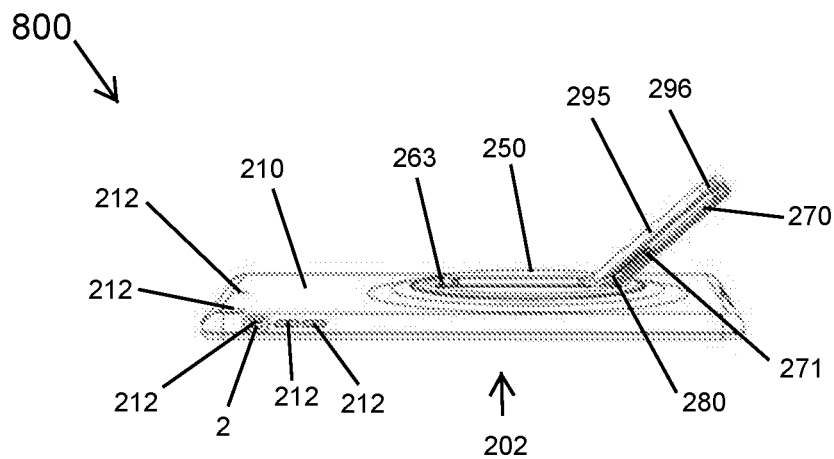
FIG. 10 is a left side perspective view of the system of FIG. 8 with a movable stand in an extended position.
Figure 11:
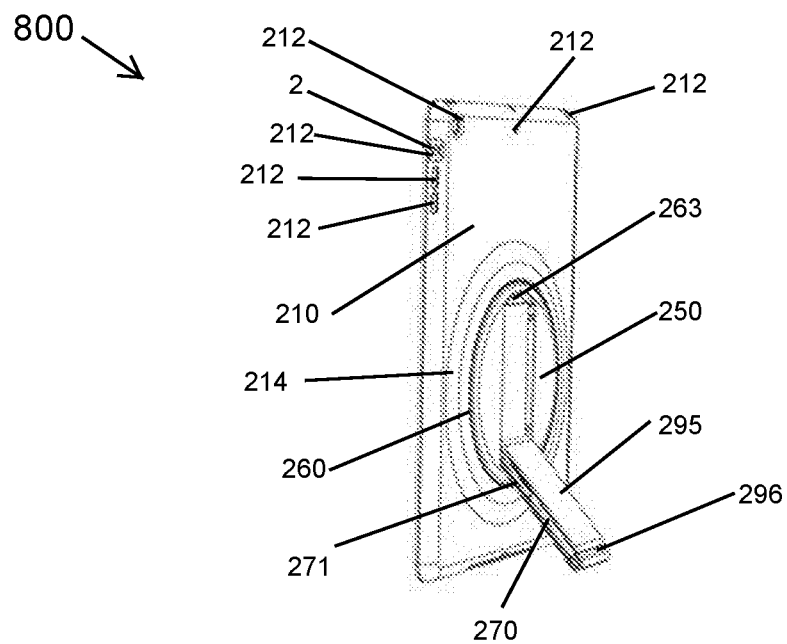
FIG. 11 is a left side rear perspective view of the system of FIG. 8 with a movable stand in an extended position to orient an electronic device holder and electronic device in a portrait orientation.
Figure 12:
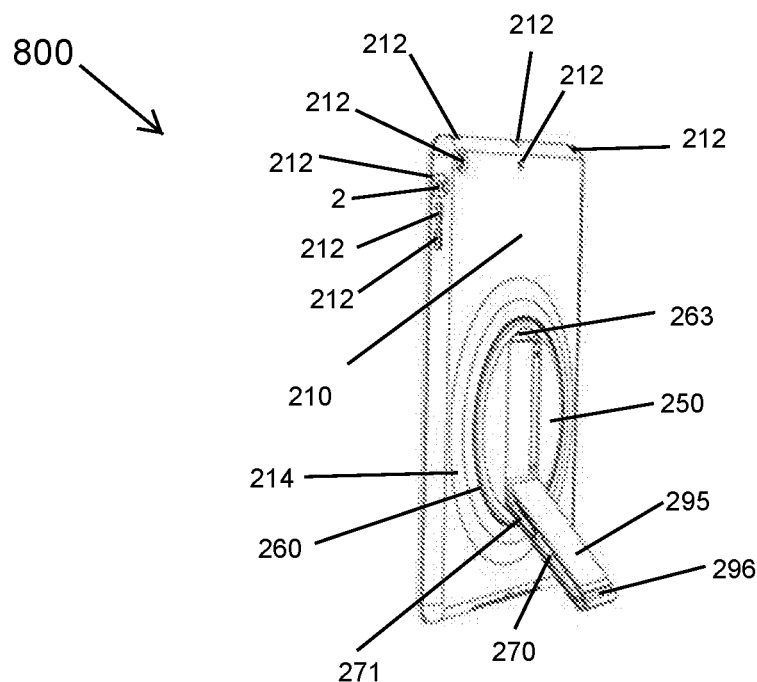
FIG. 12 is another left side rear perspective view of the system of FIG. 8 with a movable stand in an extended position to orient an electronic device holder and electronic device in a portrait orientation.
Figure 13:
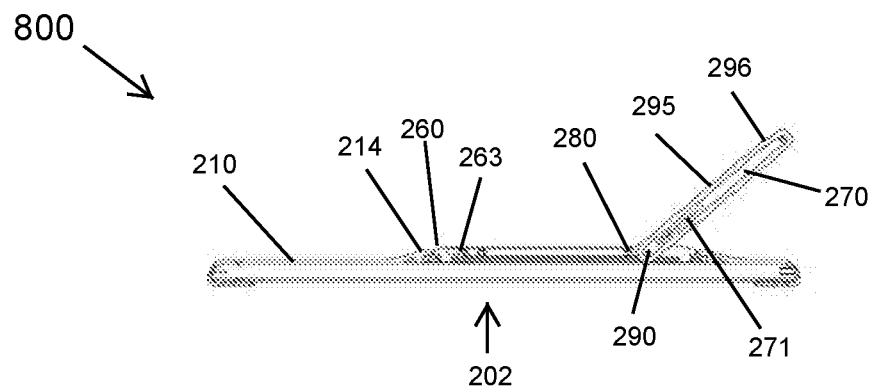
FIG. 13 is a left side cross-sectional view of the system of FIG. 8 with a movable stand in an extended position.
Figure 14:
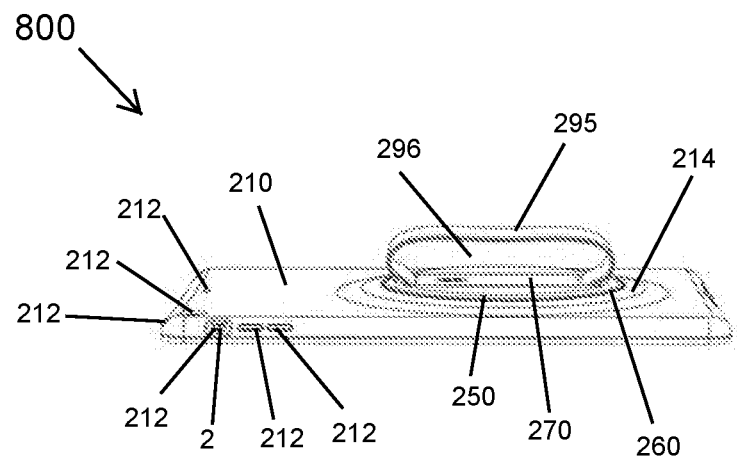
FIG. 14 is a left side rear perspective view of the system of FIG. 8 with an elastic strap in a stretched or expanded state.
Figure 15:
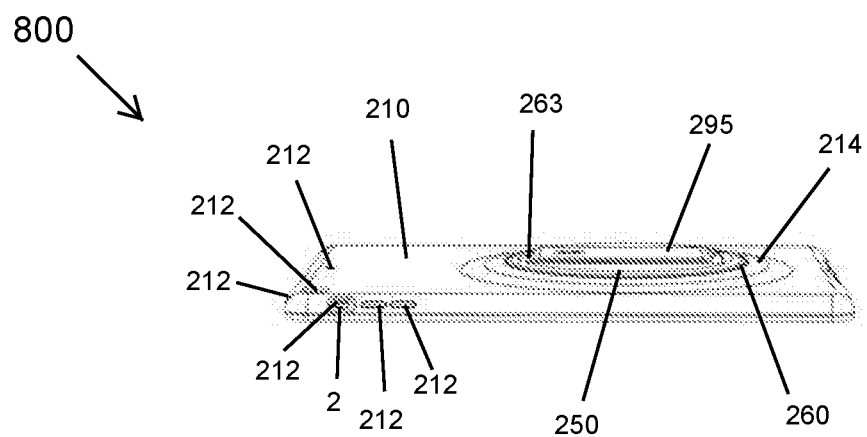
FIG. 15 is a left side rear perspective view of the system of FIG. 8 with an elastic strap in an un-stretched or unexpanded state.

For instance, coupling portion 860 illustrated in FIG. 8 may be connectable to an adapter, such as described and illustrated with respect to 6A-7B in U.S. patent application Ser. No. 13/735,702 filed Jan. 7, 2013. Alternatively, coupling portion 860 may be coupled to an object, via a mounting apparatus, such as a portion of a person (e.g., an arm, a head, etc.), a portion of a vehicle (e.g., a portion of a dash, a fold-down blind, a back of a headrest, a bicycle handle bar, etc.), an accessory (e.g., a belt, a brief case, etc.), an appliance or structure (e.g., a refrigerator, a locker, a filing cabinet, etc.), a medical device (e.g., an IV pole or stand, a physical fitness device, etc.), or an article of clothing (e.g., pants, a jacket, etc.). The coupling portion 860 may be removably attachable or mountable to the mounting apparatus, as described herein or in U.S. patent application Ser. No. 13/735,702 filed Jan. 7, 2013, or the coupling portion may be coupled directly to the object (excluding a portion of the body), without providing the mounting apparatus or without the mounting apparatus being attached to the object.

Figure 16:
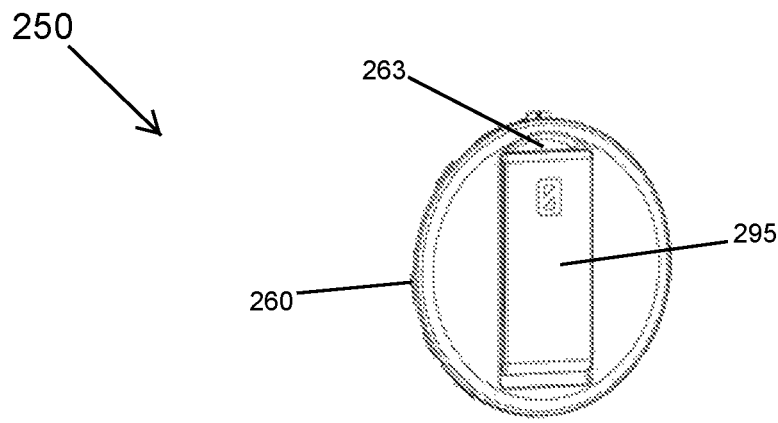
FIG. 16 is a rear perspective view of a movable stand portion according to embodiments of the present invention.
Figure 17:
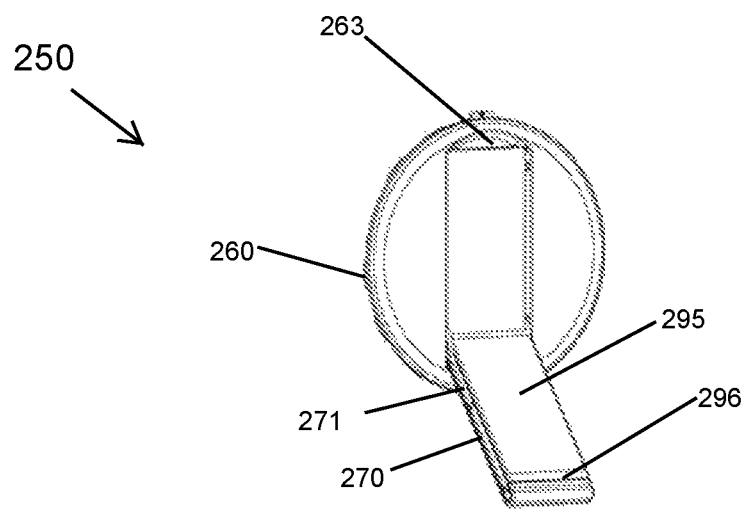
FIG. 17 is a rear perspective view of the portion of the movable stand portion illustrated in FIG. 16 with a leg or support portion of the movable stand portion in an extended position.

FIGS. 16 and 17 illustrate rear perspective views of the support portion 250 with stand 270 and strap 295 in a closed or retracted position and in an open or extended position, respectively.

Figure 18:
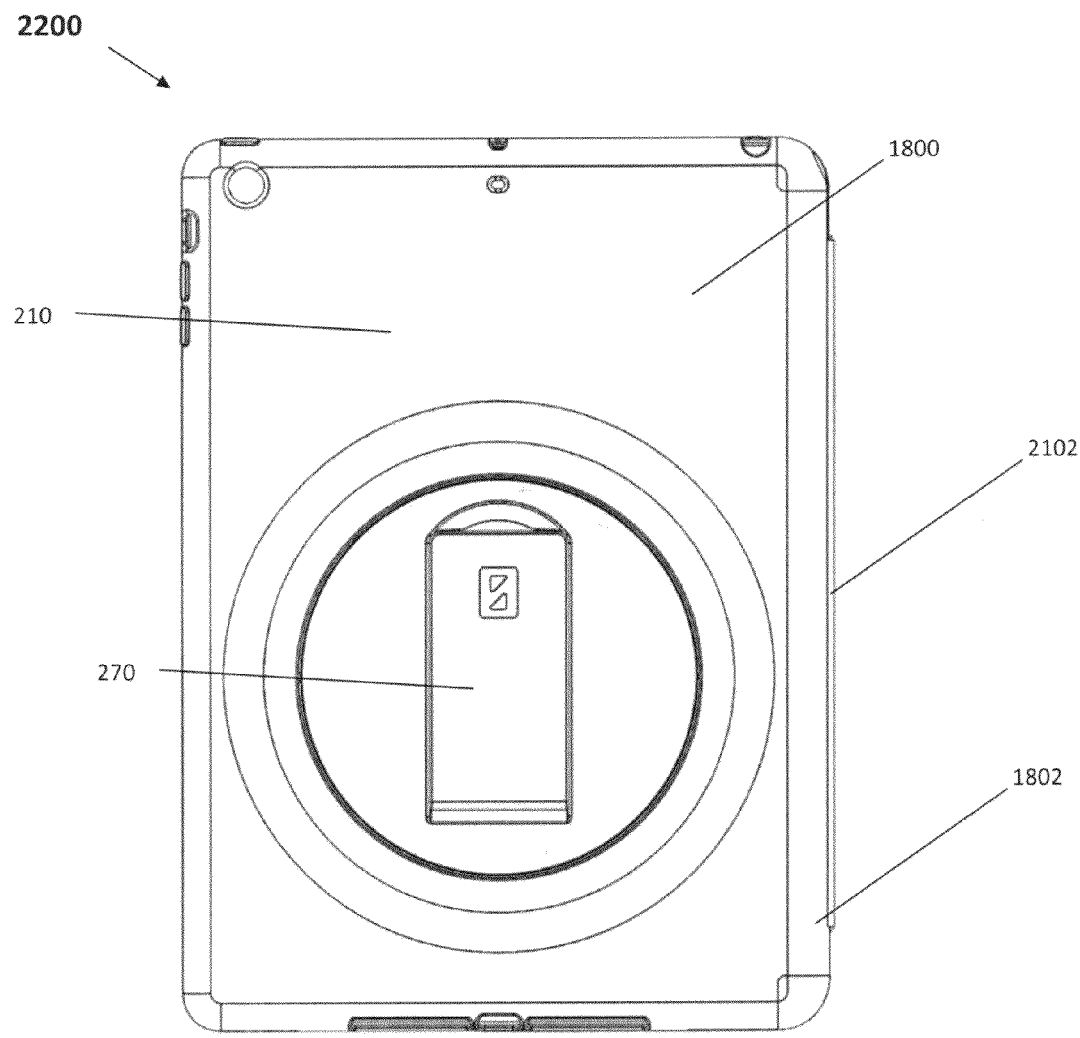
FIG. 18 is rear view of a system for supporting the electronic device according to another embodiment of the present invention, particularly illustrating an electronic device holder portion thereof.
Figure 19:
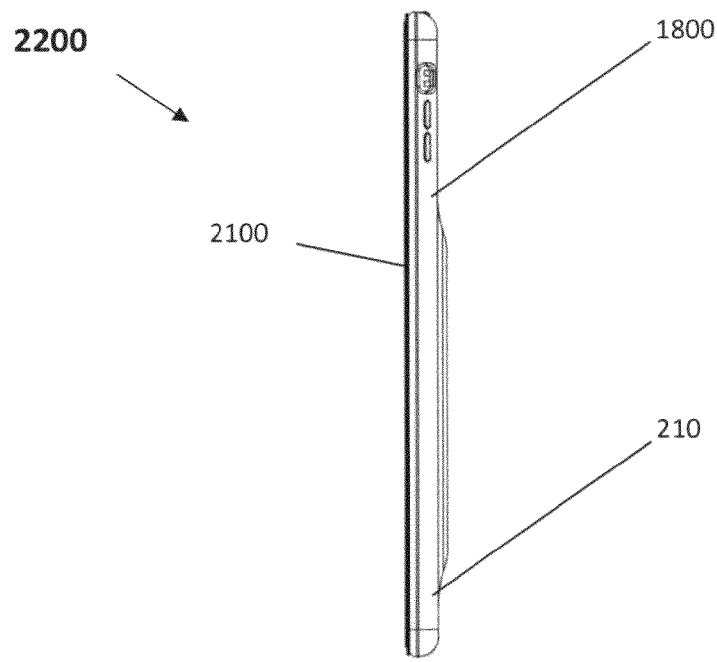
FIG. 19 is a left side view of the system of FIG. 18.
Figure 20:
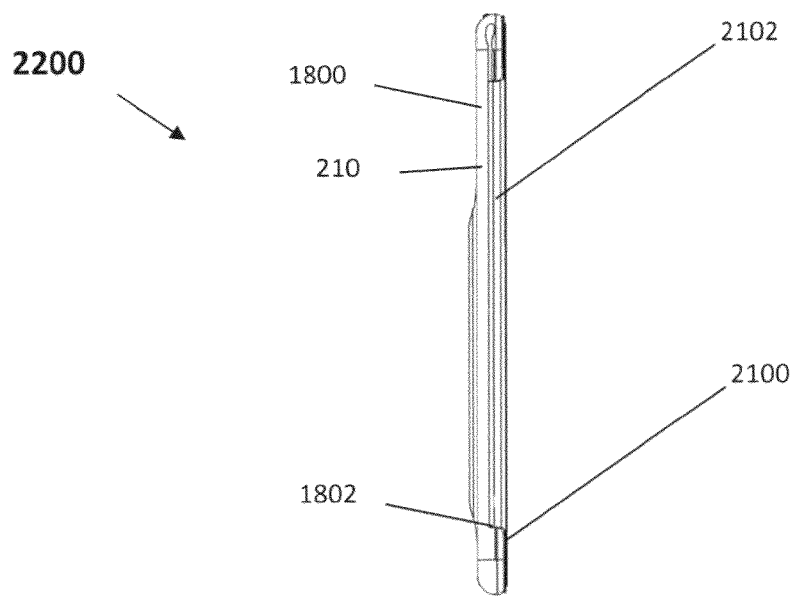
FIG. 20 is a right side view of the system of FIG. 18.
Figure 21:
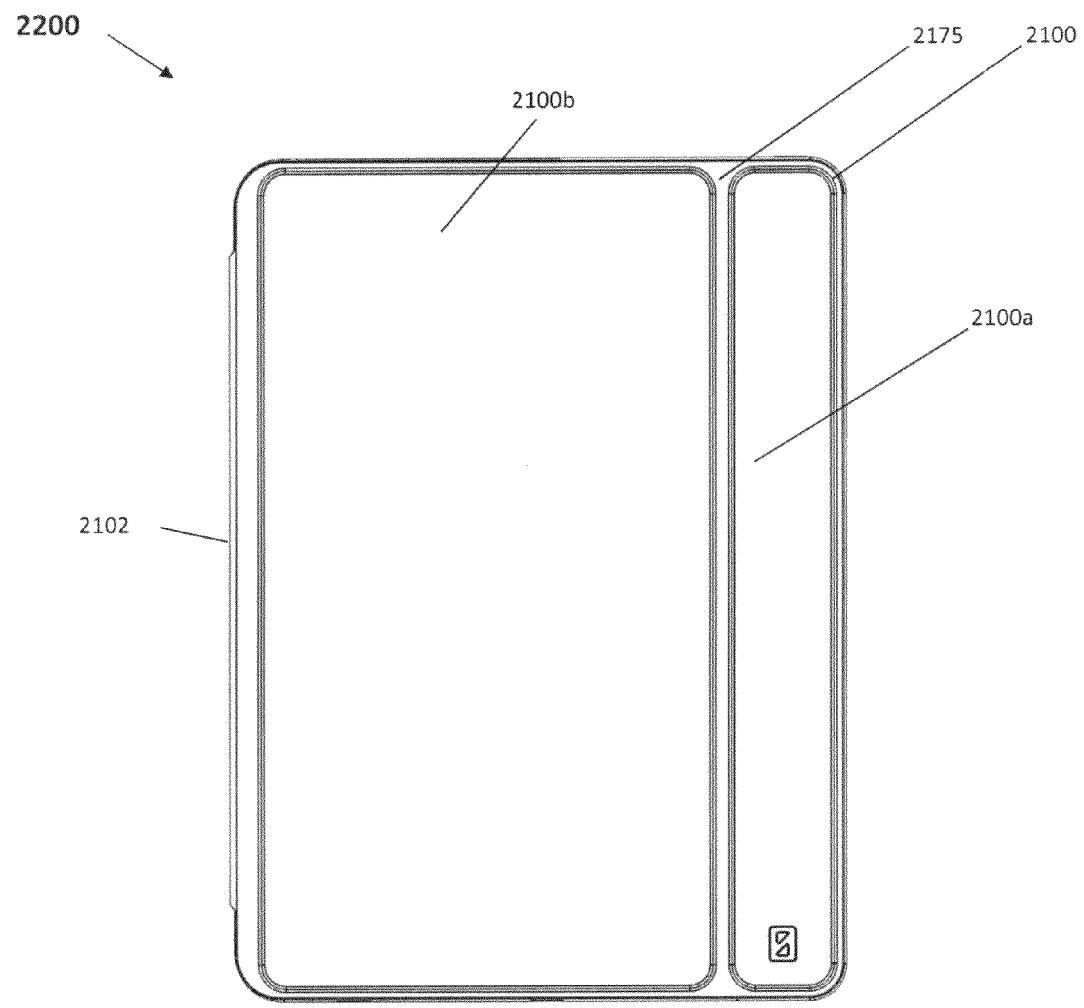
FIG. 21 is front view of the system of FIG. 18, particularly illustrating a cover or lid portion thereof.
Figure 22:
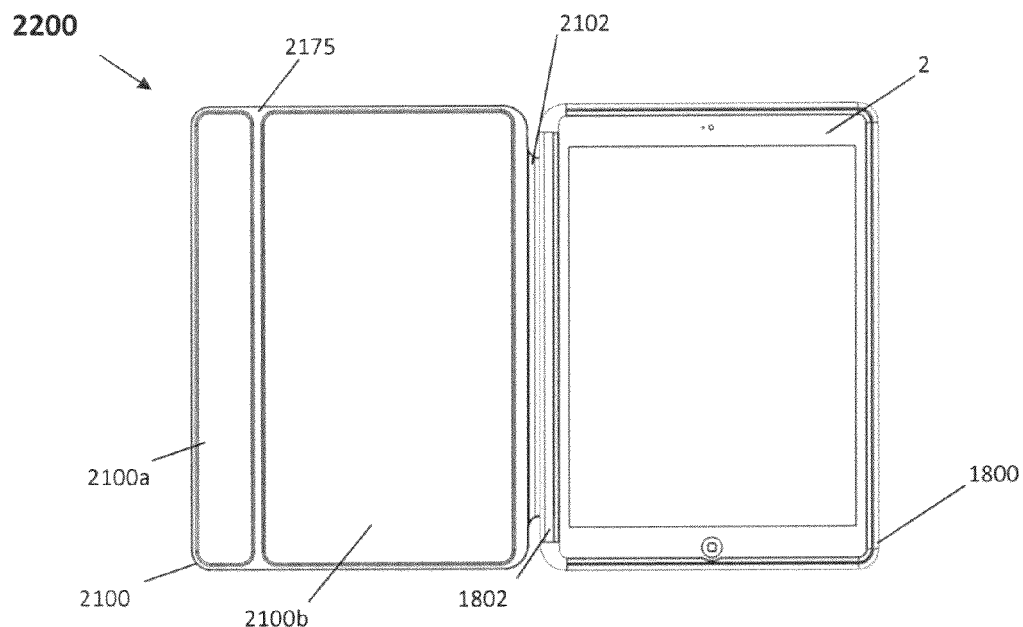
FIG. 22 is a front view of the system of FIG. 18 when the cover portion is in an open state or position.
Figure 23:
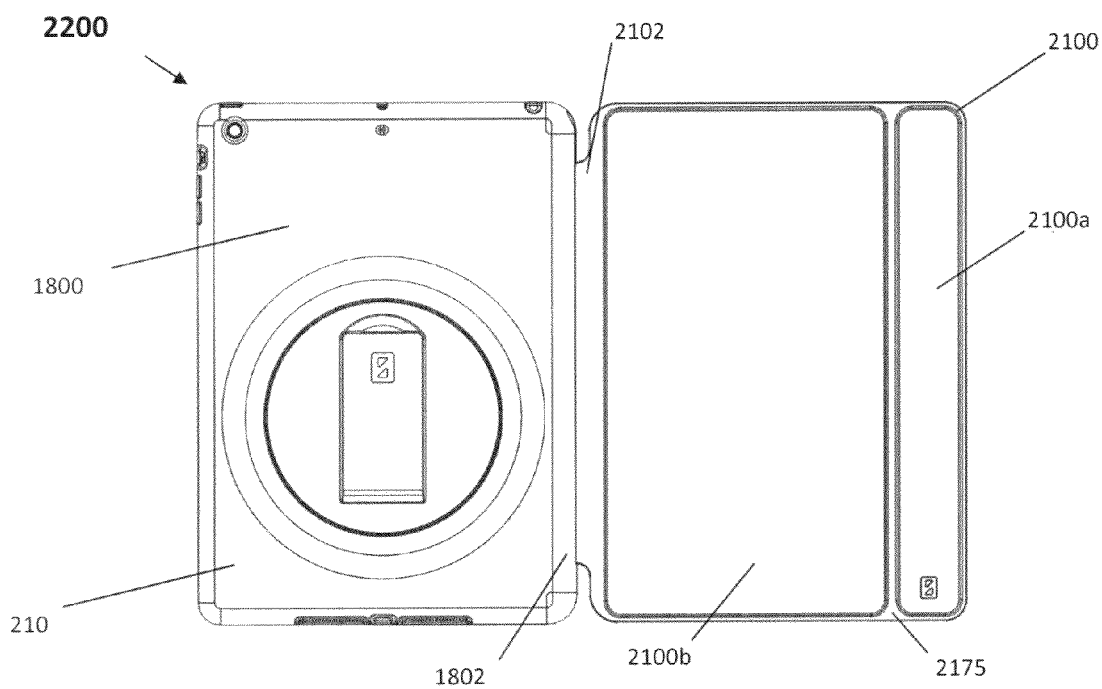
FIG. 23 is a rear view of the system of FIG. 18 when the cover portion is in an open state or position.
Figure 24:
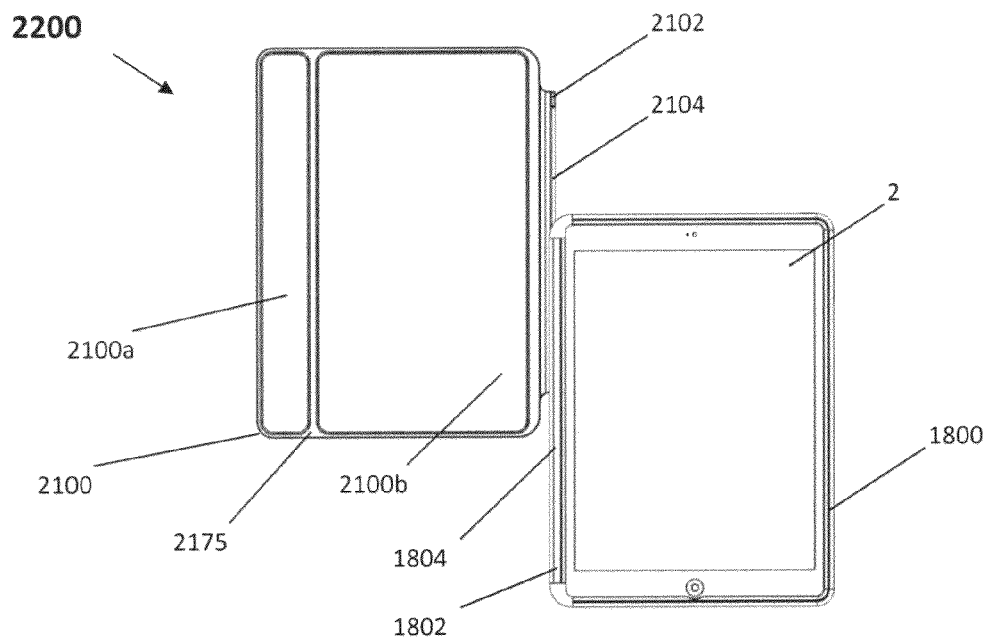
FIG. 24 is a front view of the system of FIG. 18 illustrating the slidable connectability of the electronic device holder and cover portions.
Figure 25:
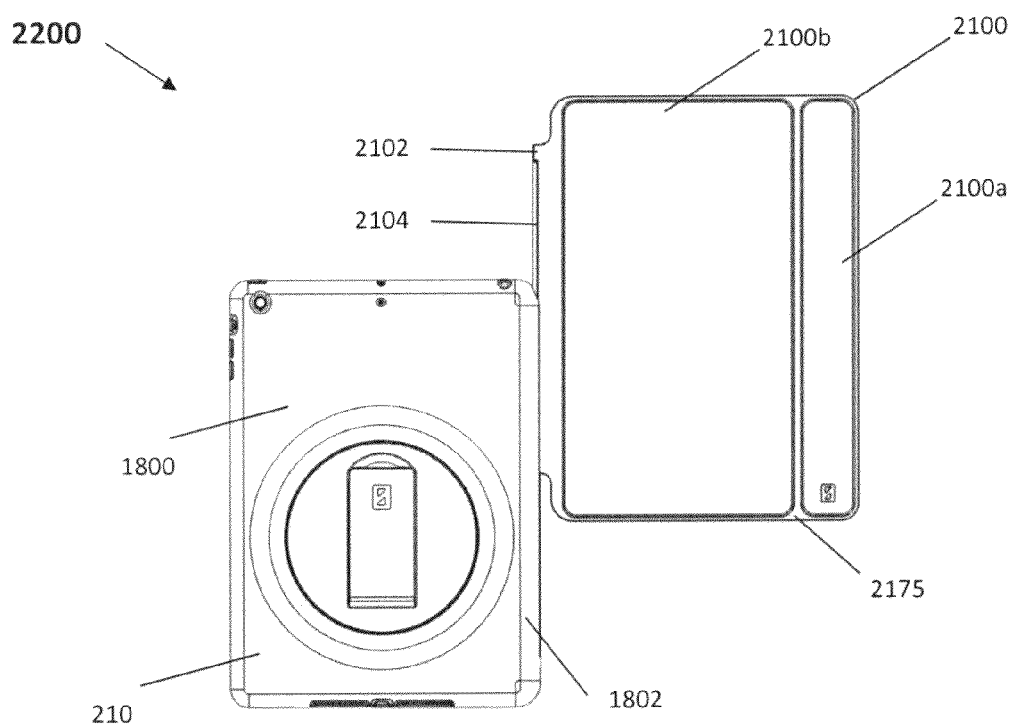
FIG. 25 is a rear view of the system of FIG. 18 illustrating the slidable connectability of the electronic device holder and cover portions.
Figure 26:
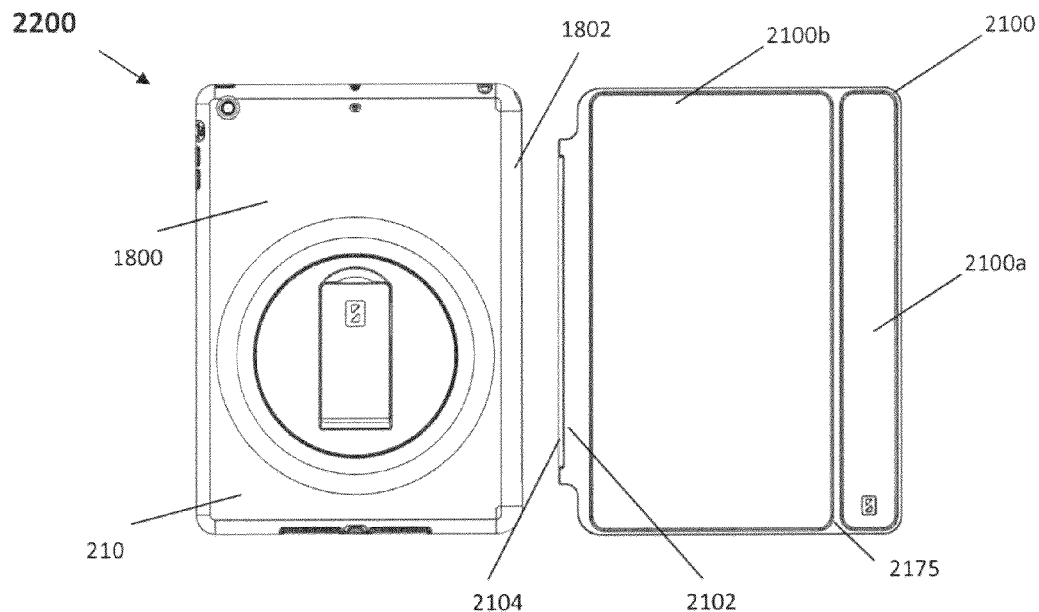
FIG. 26 is a rear view of the system for supporting the electronic device of FIG. 18 showing the electronic device holder and cover portions separated.
Figure 27:
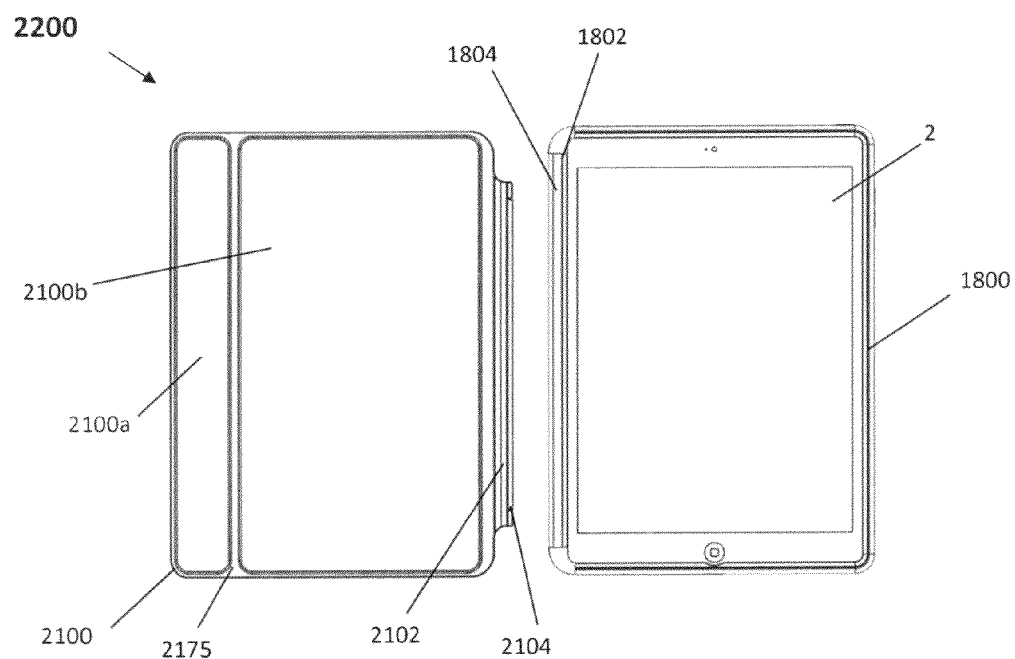
FIG. 27 is a front view of the system for supporting the electronic device of FIG. 18 showing the electronic device holder and cover portions separated.
Figure 28:
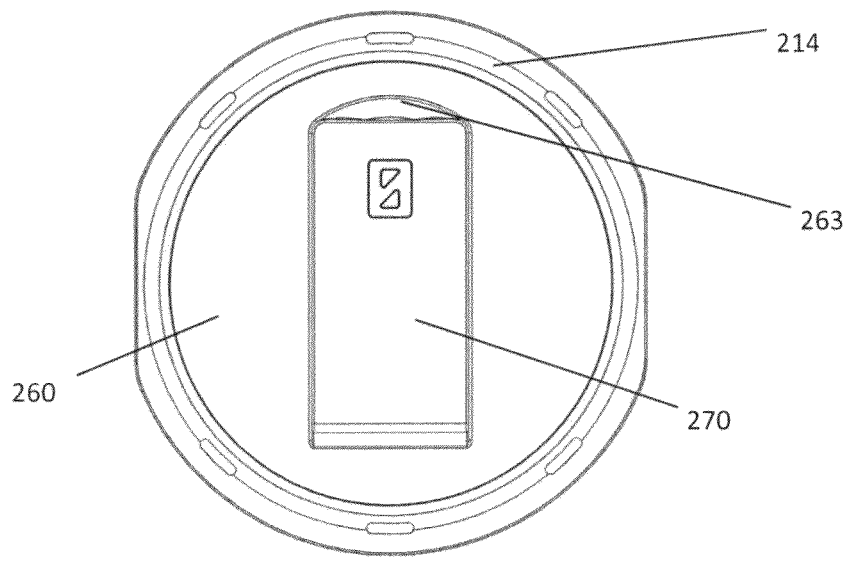
FIG. 28 is a rear view of a movable stand portion and a mounting portion for an electronic device holder according to one or more embodiments of the present invention.
Figure 29:
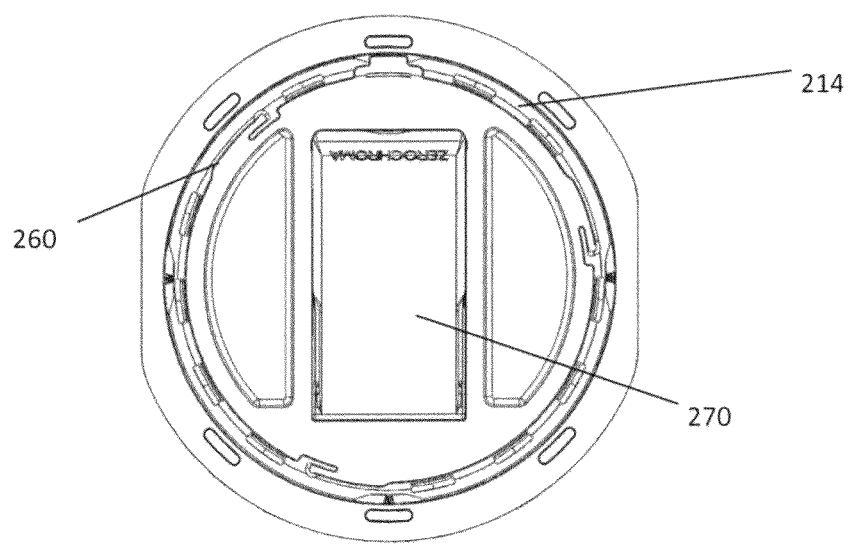
FIG. 29 is a front view of the movable stand portion and the mounting portion of FIG. 28.
Figure 30:
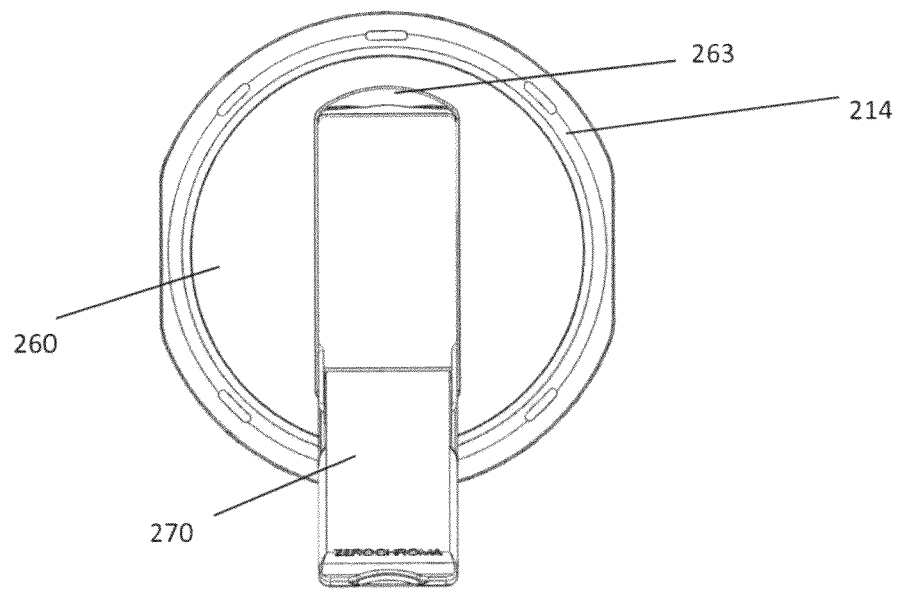
FIG. 30 is a rear view of the movable stand portion and the mounting portion of FIG. 28 with the stand in an extended position.
Figure 31:
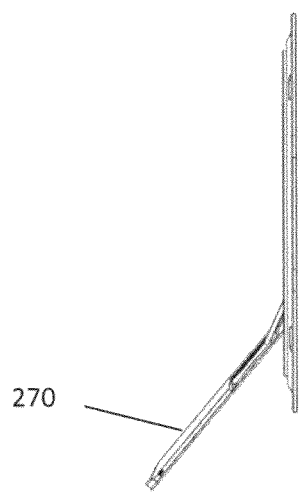
FIG. 31 is a right side view of the movable stand portion and the mounting portion of FIG. 28 with the stand in an extended position.
Figure 32:
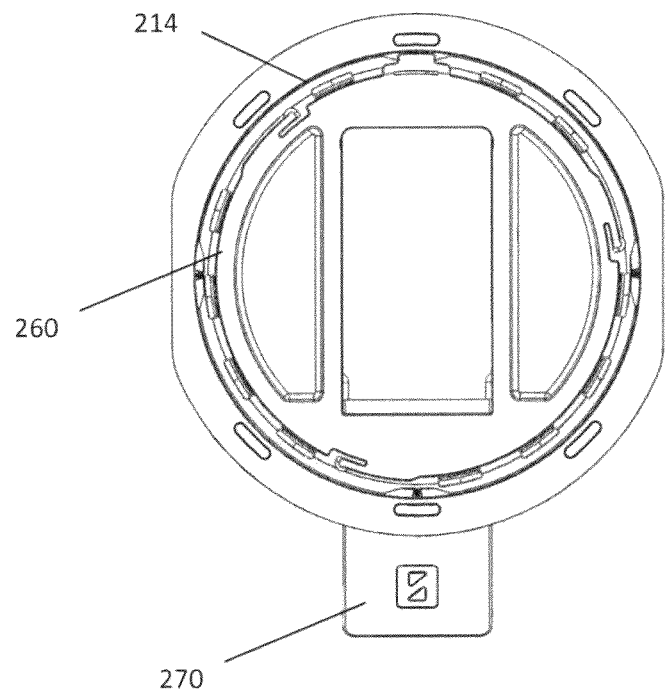
FIG. 32 is a front view of the movable stand portion and the mounting portion FIG. 28 with the stand in an extended position.
Figure 33:
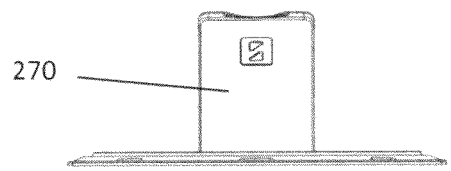
FIG. 33 is a bottom end view of the movable stand portion and the mounting portion of FIG. 28 with the stand in an extended position.
Figure 34:
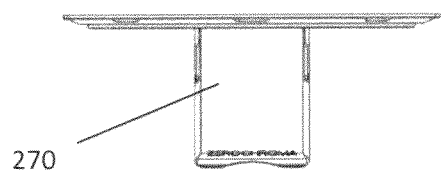
FIG. 34 is a top end view of the movable stand portion and the mounting portion of FIG. 28 with the stand in an extended position.
Figure 35:
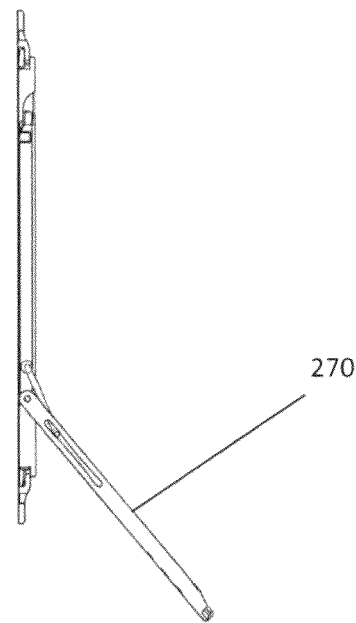
FIG. 35 is a left side cross-sectional view of the movable stand portion and the mounting portion of FIG. 28 with the stand in an extended position.
Figure 36:
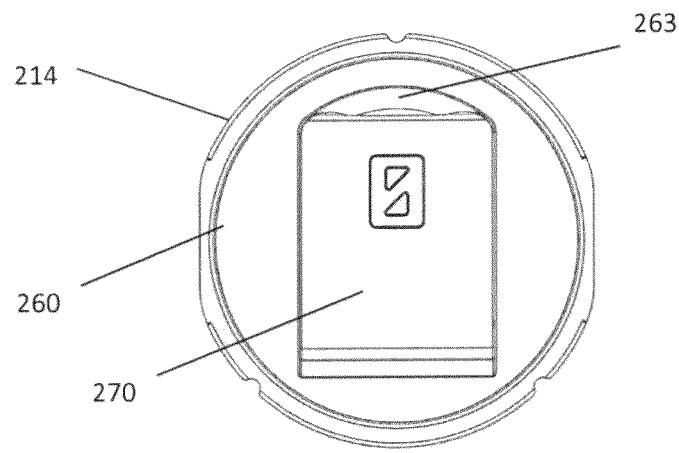
FIG. 36 is a rear view of a movable stand portion and a mounting portion for an electronic device holder according to one or more embodiments of the present invention.
Figure 37:
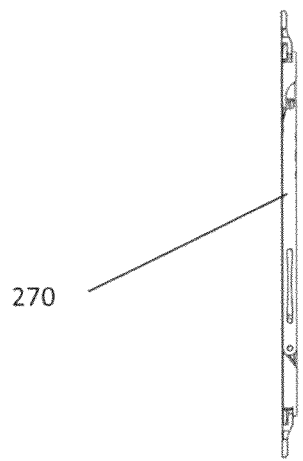
FIG. 37 is a left side cross-sectional view of the movable stand portion and the mounting portion of FIG. 36.
Figure 38:
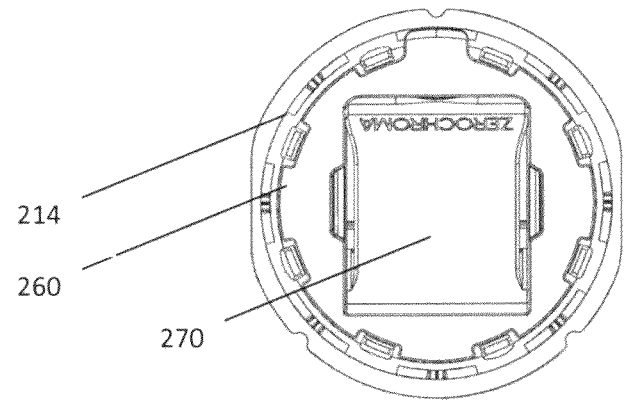
FIG. 38 is a front view of the portion of the movable stand portion and the mounting portion of FIG. 36.
Figure 39:
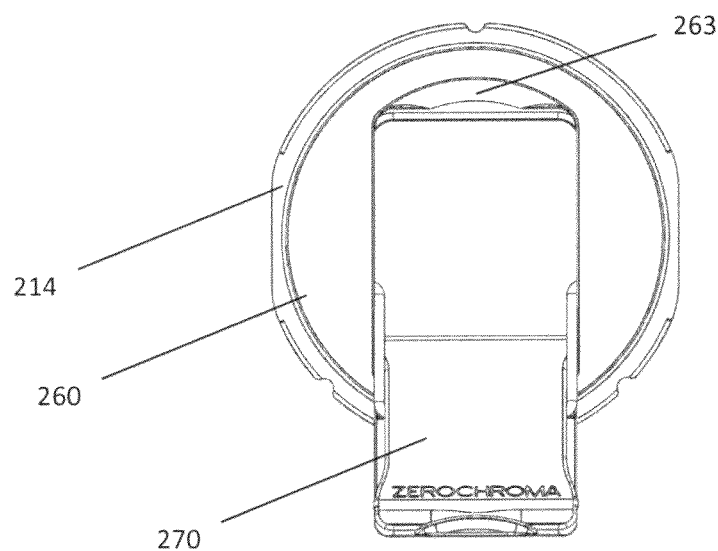
FIG. 39 is a rear view of the portion of the movable stand portion and the mounting portion of FIG. 36 with the stand in an extended position.
Figure 40:
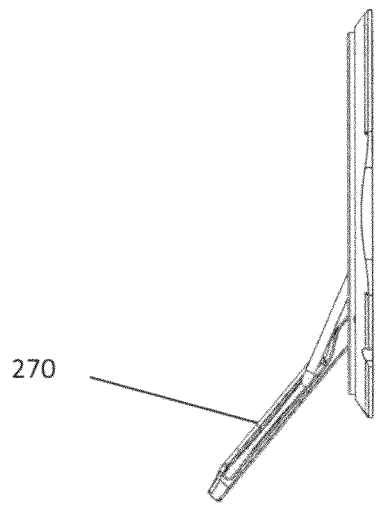
FIG. 40 is a right side view of the movable stand portion and the mounting portion of FIG. 36 with the stand in an extended position.
Figure 41:
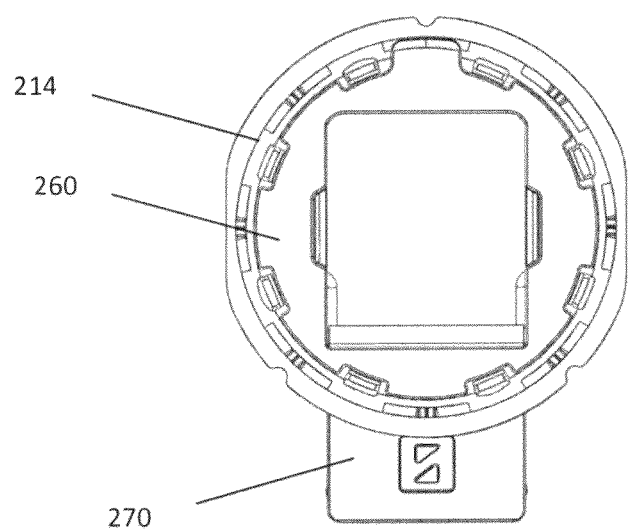
FIG. 41 is a front view of the portion of the movable stand portion and the mounting portion of FIG. 36 with the stand in an extended position.
Figure 42:
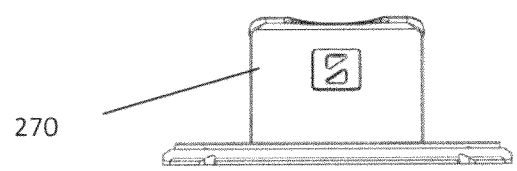
FIG. 42 is a bottom end view of the portion of the movable stand portion and the mounting portion of FIG. 36 with the stand in an extended position.
Figure 43:
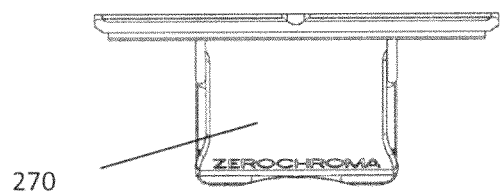
FIG. 43 is a top end view of the portion of the movable stand portion and the mounting portion of FIG. 36 with the stand in an extended position.
Figure 44:
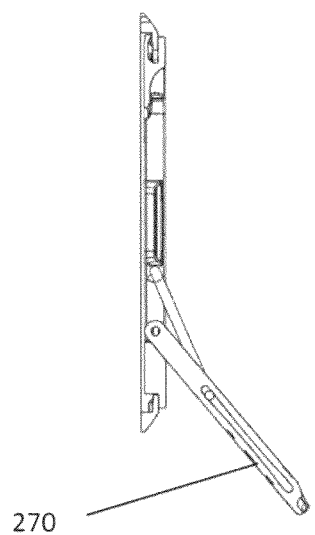
FIG. 44 is a left side cross-sectional view of the movable stand portion and the mounting portion of FIG. 36 with the stand in an extended position.
Figure 45:
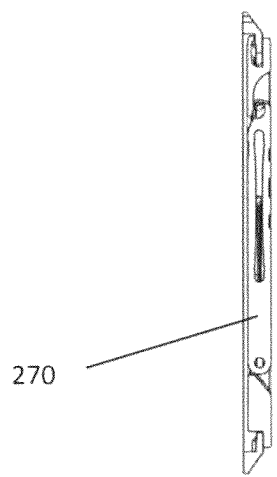
FIG. 45 is a left side cross-sectional view of the movable stand portion and the mounting portion of FIG. 36.

FIGS. 18-27 illustrate a system 2200 for supporting an electronic device 2 according to an embodiment of the present invention. System 2200 can be comprised of a cover or lid 2100 and a holder 1800, which is the same as the holder 200 discussed above with respect to FIGS. 2-7, with the exception that holder 1800 is not illustrated as including strap 295. Of course, optionally, holder 200 may be used with system 2200. Incidentally, FIGS. 18 and 21 illustrate the system 2200 from the holder side and cover side, respectively, when the cover 2100 is coupled to the holder 1800 and when the cover 2100 is closed (i.e., is folded over to cover a viewing and/or operational panel and/or screen of the electronic device).

Cover 2100, via connection mechanism 2102, may be removably coupled to a connection mechanism 1802. Optionally, connection mechanism 2102 is slidably removably coupled to connection mechanism 1802 of holder 1800. In one or more embodiments, connection mechanism 1802 is formed integrally with or formed in one piece with the body 210 of the holder 1800. Connection mechanism 1802 can include a slot 1804, and cover 2100 can include a corresponding rod portion 2104, for example, formed in one piece with the cover 2100, and insertable into the slot 1804 (e.g., by sliding) to form a hinge for the cover 2100. Optionally, the rod portion 2104 can have formed therein one or more metal rods that run along its longitudinal direction. Alternatively, the rod portion 2104 may be formed of only plastic and may not have any materials encased therein. Thus, the cover 2100 may be inserted and removed from the connection mechanism 1802 via slot 1804. The hinge provides a pivot so the cover 2100 may be rotated to cover and uncover a front portion of an electronic device, such as a display portion or control panel portion of the electronic device. Optionally, the cover 2100 may be rotatable to cover the back side of body 210, over the stand 270, etc. Optionally, connection mechanism 2012 of cover 2100 can be inserted into slot 1804 from only one side, and a stop may be provided at the end of the slot 1804 opposite the insertion side for the slot 1804. Alternatively, connection mechanism 2012 of cover 2100 can be inserted into slot 1804 from either direction.

In one or more embodiments of the present invention, cover 2100 can include a foldable portion 2175 so a first cover portion 2100a can be folded relative to a second cover portion 2100b. The folding of the first cover portion 2100a relative to the second cover portion 2100b, together with the pivoting of the cover 2100 via the hinge, can provide a stand for orienting the electronic device holder 1800 in landscape view, for instance. Optionally or alternatively, cover 2100 can have an integrated keyboard (e.g., musical or alphanumeric).

Figure 46:
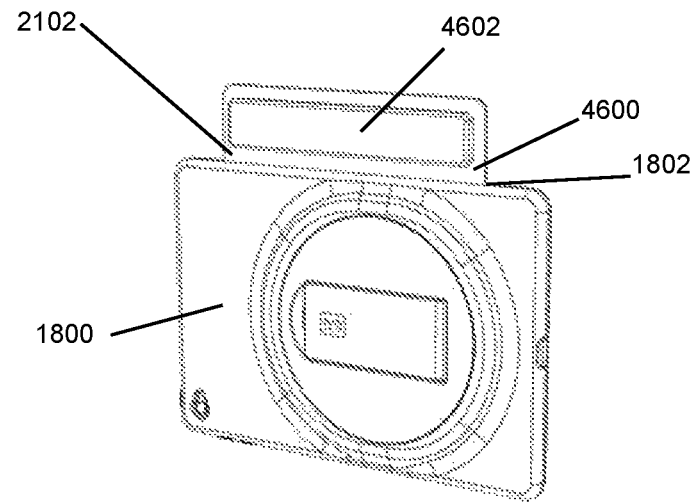
FIG. 46 is back perspective view of a system for supporting the electronic device according to an embodiment of the present invention.
Figure 47:
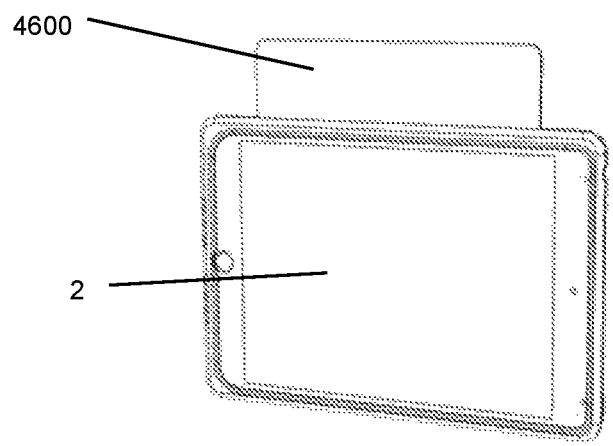
FIG. 47 is a front perspective view of the system of FIG. 46.

As noted above, cover 2100 can be removed completely, and the connection mechanism 1802 of the holder 1800 can be connected to an object 1, via a mounting apparatus 110, such as a portion of a person (e.g., an arm, a head, etc.) in the case of via the mounting apparatus, or directly or via the mounting apparatus to a portion of a vehicle (e.g., a portion of a dash, a fold-down blind, a back of a headrest, a bicycle handle bar, etc.), an accessory (e.g., a belt, a brief case, an arm band, etc.), an appliance or structure (e.g., a refrigerator, a locker, a filing cabinet, etc.), a medical device (e.g., an IV pole or stand), or an article of clothing (e.g., pants, a jacket, etc.). Optionally, the cover itself can be the mounting apparatus. For instance, the cover 2100 may have one or more magnetic portions (i.e., portions with one or more magnets) formed on an outside or inside of the cover and which are magnetically connectable to metallic objects, such as a refrigerator or a locker. FIGS. 46 and 47 illustrate an alternative embodiment of a system for supporting an electronic device 2, whereby a mounting apparatus 4600 is connectable to an electronic device holder 1800 via a connection mechanism 1802, as described and illustrated herein, of electronic device holder 1800 (or of an electronic device), and to a metallic object, such as a refrigerator, a filing cabinet, a locker, etc. Mounting apparatus 4600 can include a coupling portion 4602 in the form of a magnetic portion having one or more magnets therein. Further, such coupling portion 4602 can have a rubber or plastic shell or cover covering the magnets. Optionally, more than one distinct magnetic portions may be used, each employing one or more magnets.

FIGS. 28-37 illustrate respective views of a movable stand portion to support an electronic device holder and thus an electronic device according to one or more embodiments of the present invention. Likewise, FIGS. 38-45 illustrate respective views of a movable stand portion to support an electronic device holder and thus an electronic device according to one or more other embodiments of the present invention. The movable stand portions illustrated in FIGS. 28-37 can be constructed and operate substantially as described above with respect to FIGS. 2-7, for instance. Further, though FIGS. 28-37 are illustrated without an elastic or stretchable strap as described above, optionally, either or both embodiments may include a stretchable strap as described above. Notably regarding the embodiment in FIGS. 28-37 versus the embodiment in FIGS. 38-45, the dimensions of the stand 270 are different. That is the stand 270 in the embodiment of FIGS. 28-37 is longer and narrower than the stand 270 in the embodiment of FIGS. 38-45. Such configurations may be based on the size of the holder and/or shaped based on a desired visual style. For example, a holder to hold a relatively large electronic device, such as an electronic tablet, may use a longer narrower stand, such as illustrated in FIGS. 28-37, whereas a holder for a cellular telephone or PDA may use a shorter and wider stand, such as illustrated in FIGS. 38-45.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A system to support an electronic device, comprising:
   an electronic device holder to hold the electronic device; and
   a movable stand arranged on a back side of said electronic device holder, with a first end of said movable stand being movable between a fully closed position and at least one position to support said electronic device holder at a corresponding angle,
   wherein the movable stand includes an elastic strap fixedly coupled thereto and built therein and thereon, and
   wherein a portion of the elastic strap extends along a surface of the movable stand from the first end to a second end opposite the first end when the movable stand is in the fully closed position and when the movable stand is in the at least one position to support said electronic device holder at a corresponding angle.

2. The system according to claim 1, wherein the elastic strap is arranged on a first side of the movable stand and on a second side of the movable stand opposite the first side.

3. The system according to claim 1, wherein the elastic strap is arranged on only one side of the movable stand.

4. The system according to claim 1, wherein the elastic strap is attachable to and detachable from the movable stand.

5. The system according to claim 1, wherein the elastic strap has a portion that does not stretch.

6. The system according to claim 1, wherein the elastic strap is fixedly coupled to the movable stand at only one position.

7. The system according to claim 6, wherein the only one position is not at a hinge or pivot portion of the movable stand for movement of the first end of the movable stand between the fully closed position and the at least one position.

8. The system according to claim 6, wherein the only one position is at the first end or the second end of the movable stand.

9. The system according to claim 1, wherein the elastic strap is fixedly coupled to the movable stand at a plurality of spaced apart positions.

10. The system according to claim 1, wherein the elastic strap is fixed to only one side of the movable stand.

11. The system according to claim 10, wherein the one side of the movable stand is a side of the movable stand facing away from an internal volume of the electronic device holder to hold the electronic device when the movable stand is in the fully closed position.

12. The system according to claim 10, wherein the one side of the movable stand is a side of the movable stand facing toward an internal volume of the electronic device holder to hold the electronic device when the movable stand is in the fully closed position.

13. The system according to claim 1, wherein the electronic device holder includes a connection mechanism that is configured to be removably coupled to one or more different mounting apparatuses that are connected to corresponding objects or directly to a plurality of different objects.

14. The system according to claim 1, further comprising a mounting apparatus, the mounting apparatus being removably coupled to the electronic device holder.

15. The system according to claim 1,
   wherein the elastic strap is configured as a mounting part to mount the electronic device holder to an object, and
   wherein the elastic strap is a continuous, unbroken, and unbreakable elastic strap provided around the movable stand.

16. The system according to claim 15, wherein the electronic device holder includes a connection mechanism configured to be removably coupled to a mounting apparatus to mount the electronic device holder to an object different from the object associated with the elastic strap as the mounting part.

17. The system according to claim 1, further comprising a lid removably and rotatably coupled to said electronic device holder, the lid being rotatable from and to a closed position to an open position 180 degrees or more from the closed position.

18. The system according to claim 1, wherein the first end of said movable stand and a second end opposite said first end are flush with said electronic device holder in the fully closed position.

19. The system according to claim 1, wherein the movable stand is configured to be operative as a mounting part to mount the electronic device to an object.

20. An electronic device holder configured to support an electronic device, comprising:
   a body portion including a connection mechanism; and
   a movable stand portion connected to the body portion, the movable stand portion having a base and a stand, a first end of the stand being movable relative to the base between a fully retracted position and at least two positions to support said electronic device holder at corresponding different angles,
   wherein the connection mechanism is configured to be removably coupled to one or more different mounting apparatuses that are connectable to corresponding objects or directly to a plurality of different objects to support the electronic device such that a user can access and operate the electronic device.

21. The electronic device holder according to claim 20, wherein the stand is outwardly rotatable at least from the body portion and the base and inwardly rotatable at least toward the body portion and the base, the stand being settable in a plurality of different positions, including a fully extended position, the fully retracted position, and the at least two positions therebetween.

22. The electronic device holder according to claim 20,
   wherein the movable stand portion has an elastic band built therein and thereon, and
   wherein the elastic band is coupled to the stand of the movable stand portion.

23. The electronic device holder according to claim 20, wherein the movable stand portion has an elastic band built therein and thereon, and
wherein no space exists between the elastic band and the stand when the elastic band is in an unstretched state.

24. The electronic device holder according to claim 20, wherein the movable stand portion has an elastic band built therein and thereon, and
wherein the elastic band is formed around the stand of the movable stand portion in a length-wise direction of the stand such that no portion of the elastic band covers length-wise sides of the stand when the elastic band is in the unstretched state.

25. The electronic device holder according to claim 20, wherein the movable stand portion has an elastic band built therein and thereon, and
wherein the elastic band is coupled to the stand at a connection area, the connection area being at an end of the stand configured to contact a standing surface to support the electronic device holder.

26. The electronic device holder according to claim 20, wherein the movable stand portion has an elastic band built therein and thereon, and
wherein the elastic band is a continuous, unbroken, and unbreakable elastic band provided around the movable stand portion.

27. The electronic device holder according to claim 20, wherein the movable stand portion has an elastic band built therein and thereon, and
wherein a portion of the elastic band extends along a surface of the movable stand portion from a first end to a second end opposite the first end when the movable stand portion is in a fully retracted state and when the movable stand portion is in any non-retracted state.

28. The electronic device holder according to claim 20, wherein the movable stand portion is flush with the body portion in a fully retracted position of the movable stand portion.

29. The electronic device holder according to claim 20, wherein the connection mechanism is configured to be removably coupled to a lid as one of the different mounting apparatuses, the lid being rotatable from and to a closed position to an open position 180 degrees or more from the closed position.

30. An electronic device system configured to support an electronic device, comprising:
a body portion including a connection mechanism; and
an elastic band configured to be stretched, in response to a stretching force, from the body portion from an unstretched state to a stretched state and to return to the unstretched state when the stretching force is released,
wherein the connection mechanism is configured to be removably coupled to one or more different mounting apparatuses that are connected to corresponding objects or directly to a plurality of different objects to support the electronic device such that a user can access and operate the electronic device.

31. The electronic device system according claim 30, further comprising a movable stand portion connected to the body portion and not the connection mechanism, the movable stand portion being rotatable about a first axis and having a stand that is outwardly rotatable, about a second axis different from the first axis, at least from the body portion and inwardly rotatable at least toward the body portion, wherein the elastic band is provided around the stand of the movable stand portion.

32. The electronic device system according claim 30, wherein the elastic band is rotatable about a first axis relative to the body portion and the connection mechanism.

* * * * *